(12) United States Patent
Duvekot et al.

(10) Patent No.: US 12,516,408 B2
(45) Date of Patent: Jan. 6, 2026

(54) APPARATUS AND SYSTEM FOR THERMAL SPRAY AND RELATED METHODS THEREOF

(71) Applicant: Integrated Global Services, Inc., Richmond, VA (US)

(72) Inventors: Austin Turner Duvekot, Crozet, VA (US); Iain Stuart Hall, Richmond, VA (US); William Ryan Alemanni, Richmond, VA (US)

(73) Assignee: Integrated Global Services, Inc., Richmond, VA (US)

( * ) Notice: Subject to any disclaimer, the term of this patent is extended or adjusted under 35 U.S.C. 154(b) by 0 days.

(21) Appl. No.: 17/974,310

(22) Filed: Oct. 26, 2022

(65) Prior Publication Data

US 2023/0183848 A1 Jun. 15, 2023

Related U.S. Application Data

(60) Provisional application No. 63/272,969, filed on Oct. 28, 2021.

(51) Int. Cl.
  *C23C 4/131* (2016.01)
  *B05B 5/03* (2006.01)
  (Continued)

(52) U.S. Cl.
  CPC .............. *C23C 4/131* (2016.01); *B05B 5/032* (2013.01); *B05B 5/0533* (2013.01); *B05B 5/06* (2013.01); *B05B 7/224* (2013.01)

(58) Field of Classification Search
  CPC ....... B05B 7/224; B05B 5/032; B05B 5/0533; B05B 5/06; C23C 4/131; B23H 7/10; B23H 7/101; B23H 7/105; B23H 7/12
  See application file for complete search history.

(56) References Cited

U.S. PATENT DOCUMENTS 4,128,754 A   12/1978 Rathjen, Jr.
4,539,459 A *  9/1985 Yamagata ................ B23H 7/10
                                              219/69.12

(Continued)

FOREIGN PATENT DOCUMENTS

WO         9007384 A1    7/1990
WO    WO-0108810 A1 *    2/2001 ............ B05B 7/224

OTHER PUBLICATIONS

1 PCT App. No. PCT/US2022/047899, "International Search Report and Written Opinion", Jan. 20, 2023, 10 pages.

(Continued)

*Primary Examiner* — Steven M Cernoch
(74) *Attorney, Agent, or Firm* — Kilpatrick Townsend & Stockton, LLP

(57) ABSTRACT

This disclosure provides an apparatus, system, and method for thermal spraying a metal cladding on a substrate. The apparatus may include a housing having a first electrode and a second electrode disposed in the housing. The second electrode can be spaced apart from the first electrode. The apparatus includes a first contact tip removably attached to the first electrode and a second contact tip removably attached to the second electrode. The position of the first contact tip and second contact tip is configured to be selectively adjusted on the first electrode and the second electrode to provide a plurality of contact surfaces for a feedstock wire. The apparatus includes a nozzle between the first contact tip and the second contact tip. The first contact tip and the second contact tip are configured to contact and deflect a wire towards the nozzle.

12 Claims, 21 Drawing Sheets

(51) Int. Cl.
  *B05B 5/053* (2006.01)
  *B05B 5/06* (2006.01)
  *B05B 7/22* (2006.01)

(56) References Cited

U.S. PATENT DOCUMENTS

| | | | | |
|---|---|---|---|---|
| 5,384,444 A | * | 1/1995 | Truty | B23K 9/32 |
| | | | | 219/69.12 |
| 2002/0074422 A1 | * | 6/2002 | Tudor | C23C 4/131 |
| | | | | 239/83 |

OTHER PUBLICATIONS

International Application No. PCT/US2022/047899 , "International Preliminary Report on Patentability", May 10, 2024, 6 pages.

* cited by examiner

APPARATUS AND SYSTEM FOR THERMAL SPRAY AND RELATED METHODS THEREOF

CROSS-REFERENCE TO RELATED APPLICATION

This application claims the benefit of and priority to U.S. Provisional Application No. 63/272,969, filed Oct. 28, 2021, the entirety of which is incorporated by reference herein for all intents and purposes.

BACKGROUND OF THE INVENTION

Thermal spray is a coating process in which melted or heated materials are sprayed onto a substrate (e.g., a metal surface). For example, thermal spray techniques can be employed to apply a metal cladding to a substrate. The cladding provides the substrate with enhanced performance properties such as, for example, erosion resistance, corrosion resistance, wear resistance from the environment, etc.

Conventional thermal spray systems are situated in workshops where substrates (e.g., parts or components) are held in fixtures. In these workshops, the substrate, the thermal spray apparatus, or both are manipulated to apply a cladding to the substrate. A smaller percentage of thermal spray applications occur outside of workshop settings, in the field, where thermal spray cladding is applied to substrates in-situ. In these cases, the substrates are typically large and cannot be easily moved. For example, a steel bridge may be clad with a layer of aluminum to protect it from rusting under naturally occurring elements such as heat, rain, and salt fog conditions.

Production losses during thermal spray are highly impactful when equipment requires maintenance in planned or unplanned events. Apart from the loss in revenue for manufactured or refined products, the interruption in power generation, waste processing, or feedstock for other industries has a high level of criticality with significant hourly impact. The application of protective cladding material to enable these facilities to operate reliably for long duty cycles is conducted during tightly controlled maintenance windows, shutdowns, or turnarounds. In these carefully choreographed maintenance windows, significant time is required for cleaning, creating safe access, inspecting, and preparing surfaces for metal cladding. Therefore, a very limited amount of time is available for thermal spray of metal cladding on these large surfaces. For example, it is common that only 4 to 5 hours out of a shift of 12 hours is available for the cladding process itself. Consequently, very high availability and consistent quality is required of thermal spray equipment in these short windows. For example, a 30-minute stop for a technician to service, or switch out a piece of cladding equipment, may result in a 10% increase in the total time taken for a cladding operation resulting in thousands of pounds of lost refining fuel, chemicals, paper, tons of steel, or power. Similarly, in the case of large workshop applications requiring several hours of thermal spray application, such as automated cladding of large paper rolls or machine components, continuous process stability is required to ensure uniform, interruption free, high quality application of cladding.

SUMMARY OF THE INVENTION

This disclosure relates to an apparatus, system, and method for thermal spraying a metal cladding on a substrate. In some embodiments, the present disclosure provides a spray apparatus including a housing. The housing may include a first electrode and a second electrode disposed in the housing. The second electrode can be spaced apart from the first electrode. The apparatus includes a first contact tip removably attached to the first electrode and a second contact tip removably attached to the second electrode. The position of the first contact tip and second contact tip is configured to be selectively adjusted on the first electrode and the second electrode. The apparatus includes a nozzle between the first contact tip and the second contact tip. The first contact tip and the second contact tip are configured to contact and deflect a wire towards the nozzle. In some embodiments, at least one of the first contact tip or the second contact tip comprises a first end and a second end, wherein the first end comprises a front face and an opposing rear face. In some embodiments, the front face comprises a plurality of grooves for receiving the wire in one of the plurality of grooves. In some embodiments, the plurality of grooves are sequentially arranged around the front face. In some embodiments, the rear face of the contact tip comprises a plurality of notches. In some embodiments, the second end comprises an intrusion for receiving a tool, wherein the tool is configured to rotate the first contact tip and the second contact tip to secure a protrusion in a notch of the plurality of notches on the rear face. In some embodiments, the first contact tip and the second contact tip comprise a disc comprising: a first end and a second end, wherein the first end comprises a front face and an opposing rear face; and a plurality of grooves disposed on the front face. In some embodiments, the contact tip comprises a cylindrical rod comprising an outer surface. In some embodiments, the cylindrical rod comprises a plurality of grooves disposed on the outer surface of the cylindrical rod, wherein the plurality of grooves are configured for contacting and guiding a wire. In some embodiments, the cylindrical rod further comprises a screw thread to adjust a position of the plurality of grooves disposed on the outer surface of the cylindrical rod. In some embodiments, the apparatus includes an actuator coupled to the first contact tip and the second contact tip to continuously or sequentially rotate the first contact tip, the second contact tip, or both. In some embodiments, the actuator is configured to continuously rotate the first contact tip and the second contact tip at a constant rate. In some embodiments, the first contact tip and second tip comprise a smooth exterior surface. In some embodiments, the first contact tip and second tip comprise a pair of rods for guiding the wire between the rods of the first contact tip and second tip. In some embodiments, the apparatus includes a high-velocity gas system. In some embodiments, the apparatus includes a first wire contacting the first contact tip and a second wire contacting the second contact tip. In some embodiments, the apparatus includes a drive system configured to: feed the first wire through a first channel to the nozzle via the first contact tip; and feed the second wire through a second channel to the nozzle via the second contact tip.

In some embodiments, the present disclosure provides a system for spraying atomized particles. The system includes a spray apparatus comprising: a housing; a first electrode and a second electrode disposed in the housing, wherein the second electrode is spaced apart from the first electrode; a first contact tip removably attached to the first electrode and a second contact tip removably attached second electrode, wherein the first contact tip and second contact tip are configured to be selectively adjusted on the first electrode and the second electrode; a first channel disposed in the housing; and a second channel disposed in the housing. The system includes a first wire configured to be fed through the first channel for contacting the first contact tip on the first electrode. The system includes a second wire configured to be fed through the second channel for contacting the second contact tip on the second electrode. The first contact tip and the second contact tip are configured to contact and deflect the first wire and the second wire. In some embodiments, the spray apparatus further comprises: a nozzle disposed between the first contact tip and the second contact tip, wherein the first contact tip and the second contact tip are configured to deflect a wire towards the nozzle; and a drive system for feeding the first wire through the first channel and the second wire through the second channel. In some embodiments, the spray apparatus further comprises a gas supply flow line configured to receive a high-velocity atomizing air jet. In some embodiments, the first contact tip and the second contact tip do not block the gas supply flow line. In some embodiments, the first electrode is an anode and the second electrode is a cathode, wherein the first wire and the second wire are configured to short circuit at the nozzle. In some embodiments, the first contact tip and the second contact tip comprise a disc comprising: a first end and a second end, wherein the first end comprises a front face and an opposing rear face; and a plurality of grooves disposed on the front face. In some embodiments, the first contact tip and the second contact tip comprise cylindrical rod comprising a plurality of grooves disposed on an outer surface of the cylindrical rod, wherein the plurality of grooves are configured for contacting and guiding the first wire and the second wire.

In some embodiments, the present disclosure provides a method for applying a metal cladding. The method includes providing a thermal spray apparatus comprising: a first electrode; a second electrode spaced apart from the first electrode; a first contact tip removably attached to the first electrode and a second contact tip removably attached second electrode; a first channel; a second channel; and a nozzle upstream from the first channel and the second channel. The method includes feeding a first wire through the first channel for contacting the first contact tip on the first electrode. The method includes feeding a second wire through the second channel for contacting the second contact tip on the second electrode. The method includes deflecting the first wire via the first contact tip and the second wire via the second contact tip to the nozzle. The method includes applying a current through the first electrode and the second electrode to atomize the first wire and the second wire at a contact point in the nozzle. The method includes applying an air jet to spray atomized particles through the nozzle. The method includes adjusting a position of at least one of the first contact tip or the second contact tip depending on an amount of wear on a surface of the first contact tip or the second contact tip. In some embodiments, at least one of the first contact tip and the second contact tip comprises a disc comprising a first end and a second end, wherein the first end comprises a front face and an opposing rear face, wherein the front face comprises a plurality of grooves. In some embodiments, at least one of the first contact tip and the second contact tip comprises a disc comprising a first end and a second end, wherein the first end comprises a front face and an opposing rear face, wherein the front face comprises a plurality of grooves. In some embodiments, wherein at least one of the first contact tip and the second contact tip comprises a cylindrical rod comprising an outer surface comprising a plurality of grooves disposed on the outer surface of the rod, wherein the plurality of grooves are configured for contacting and guiding a wire. In some embodiments, the method includes automatically adjusting a position of the first contact tip and the second contact tip in a continuous or sequential manner.

Numerous benefits are achieved by way of the present invention over conventional thermal spray devices and systems. For example, embodiments of the present invention speeds up the overall cladding process, reduces the overall downtime, reduces costs for maintenance, thus leading to increased production and efficiency. In some embodiments, the design and operation of a thermal spray apparatus including the contact tips described herein eliminates the need for service stops for applying the metal cladding. For example, the contact tips in the thermal spray apparatus provide a plurality of wear surfaces for continuous in situ application. Furthermore, the geometry of the contact tips described herein provide no blockage to the high velocity gas flow through the thermal spray apparatus, prior to atomization of the feedstock wire. These and other embodiments of the disclosure, along with many of its advantages and features, are described in more detail in conjunction with the text below and corresponding figures.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION OF SPECIFIC EMBODIMENTS

Figure 1:
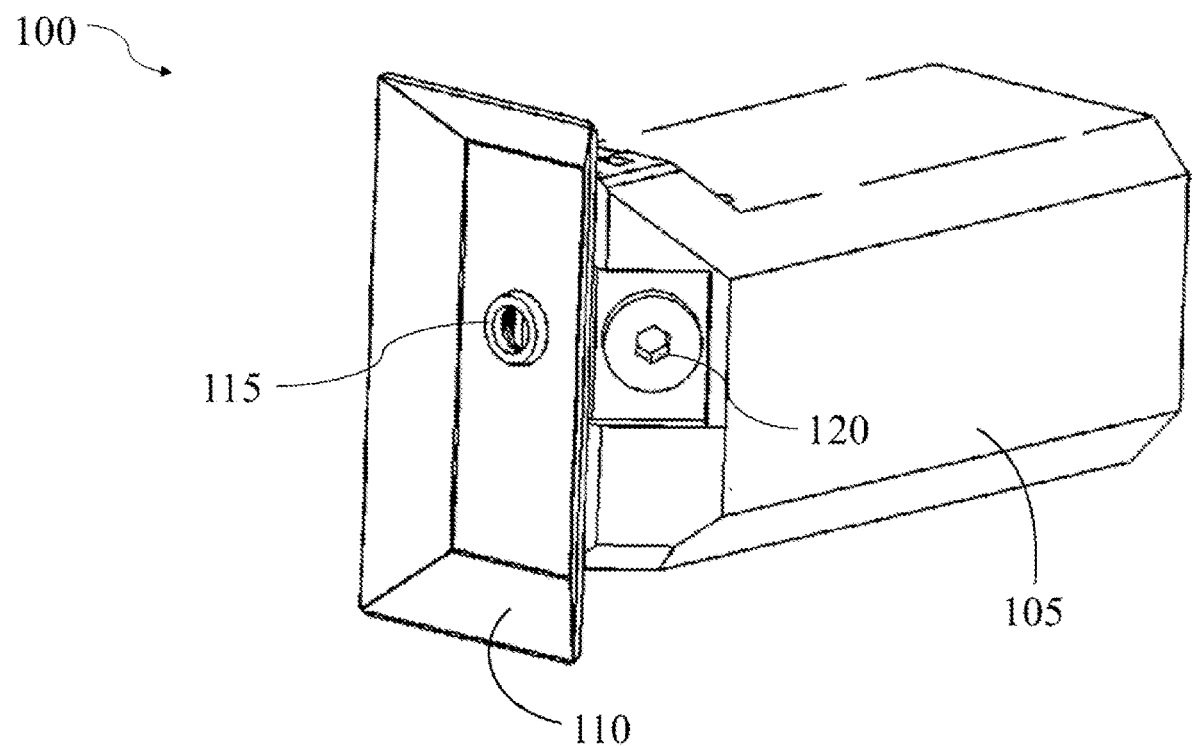
FIG. 1 shows a front perspective view of a thermal spray apparatus according to embodiments of the present invention.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Conventionally, thermal spray systems are situated in workshops where substrates (e.g., parts or components) are held in fixtures. In limited cases, thermal spray applications occur outside of workshop settings, in the field, where thermal spray cladding is applied to substrates in-situ. In situ application of metal claddings is advantageous in that a technician can travel on-site, apply the metal cladding to a substrate, and the substrate can return to operation. This avoids the transportation and delays associated with sending equipment to an outside facility for repairs. This is particularly advantageous where alloys of much higher corrosion or wear resistance are applied to the internal surfaces of equipment (e.g., vessels, ducts, boilers, tanks, paper rolls) and similar large structures in critical process equipment. The operation of this equipment is characterized by long uninterrupted operational cycles, often lasting several years between inspection and maintenance cycles to provide continuous petroleum refining, paper production, electricity generation, steel production, etc. The application of protective cladding material to enable these facilities to operate reliably for long duty cycles is conducted during tightly controlled maintenance windows, shutdowns, or turn-arounds. In these carefully choreographed maintenance windows, significant time is required for cleaning, creating safe access, inspecting, and preparing surfaces for metal cladding.

However, conventional equipment for thermal spray also has significant downtime due to maintenance and repairs during application of a metal cladding. For example, arc welding is a type of thermal spray process using an electric arc to create heat to melt and join metals. An arc spray apparatus provides electrical power to two feedstock wires at a location proximal to the point of intersection between the feedstock wires fed into the apparatus by an upstream drive system. The two feedstock wires are positively or negatively charged such that a potential difference exists between them that would give rise to an electrical arc at the point of intersection. The arc spray apparatus utilizes either high or low velocity atomizing gas streams to spray the atomized particles at the intersection point to form a metal cladding layer. The components of the arc spray apparatus that precede the intersection point of contact are commonly referred to as contact tips and convey the electrical charge and current flow to the feedstock from an external power supply.

Over the course of operation of the arc spray apparatus, the contact tips wear down due to the deflection force on the contact tip required to guide and establish solid electrical contact with each feedstock wire. The wear on the surface of the contact tips can lead to deviation of the feedstock wire from the initial point of intersection. The positional change of the feedstock wires from the intersection point, or misalignment of the feedstock wires, may result in poor atomization characteristics as the feedstock wire is no longer in the path of the optimized gas stream. The misalignment of the feedstock wires may also result in poor arc formation if the central axes of the feedstock wires are not aligned. This can result in a flared jet and deposition pattern resulting in an uneven metal cladding application. Dirt or deposits rubbing off the feedstock wire onto the contact tip may also cause local breakdown in current transmission with arc interruptions causing atomization interruption and wire sputtering, with coarse particles projected onto the prepared surface with poor quality. Therefore, the contact tips are often replaced during thermal spray.

Contact tip replacement operations typically require removal of a front cap or nozzle assembly from the arc spray apparatus. For high performance, high velocity arc spray devices, with complex gas injection and throat geometries, this disassembly can be substantially time consuming. Once disassembled, the use of an external tool may be required to unscrew the tip or fixture holding the tips in place. The replacement of the tip with a new unit requires re-feeding the wire through the new tip or guide assembly, and replacement of the nozzle components. While material and geometric design revisions to contact tips serve to mitigate these effects somewhat, tips still need to be routinely replaced during operation to avoid interruptions and quality degradation.

Embodiments of the present disclosure provides an apparatus and system for thermal spray that reduces or eliminates downtime during application of a metal cladding. In particular, the contact tips described herein enables adjustment (e.g., manual or automatic) of the contact tips that provides a plurality of new wear surfaces for contact with the wire feedstock without necessitating any disassembly or part removal. The apparatus and system described herein enables adjusting the contact tips in the apparatus to provide new contact and guide surfaces for the feedstock wire without any need for part removal, wire adjustment, or replacement. For example, the contact tips can be adjusted manually with a tool (e.g., turning a thumb wheel, screwdriver, or hex key tool) during operation of thermal spray apparatus. In some embodiments, the contact tip is configured as a rod or disc that is rotationally indexable to present a new radial or grooved surface for contact with the feedstock wire fed through the thermal spray apparatus. The contact tips provide a plurality of contact surfaces thereby enabling continuous operation without any need for any servicing. Additionally, the contact tips may further serve to guide the feedstock wire so that the point of intersection between two feedstock wires is well controlled for effective atomization of molten metal produced in the electric arc between the two feedstock wires. In some embodiments, the contact tips advantageously remain outside of the gas flow path eliminating upstream blockage of high velocity gas prior to the wire atomization location (e.g., the intersection point of two feedstock wires at the nozzle).

In some embodiments, the thermal spray apparatus can be an electric wire arc thermal spraying apparatus. The arc spray coatings can be produced via an electric arc produced across two oppositely changed feedstock wires which causes the wires to melt. A gas supply then atomizes the molten metal and propels it onto the surface, forming a coating. Arc spray coatings are used for many purposes and thus many different materials are used in the arc spray process. Arc spray coatings are composed of many small metallic droplets which build up on the substrate and one another to form a desired coating thickness. Arc spray processes can form coatings with a certain degree of porosity as well as oxides within the coating structure.

Embodiments of the present invention provide a spray apparatus comprising a housing. The housing includes a first electrode and a second electrode disposed in the housing. The second electrode may be spaced apart from the first electrode. A first contact tip can be removably attached to the first electrode and a second contact tip can be removably attached to the second electrode. Each of the first contact tip and the second contact tip may include a plurality of contact surfaces. In some embodiments, the contact surfaces may be configured to guide and deflect a feedstock wire to a nozzle of the thermal spray apparatus. In some embodiments, the position of the first contact tip and second contact tip that contacts the feedstock wire can be selectively adjusted on the first electrode and the second electrode to provide a different contact surface from the plurality of contact surfaces. The thermal spray apparatus may include a nozzle located between the first contact tip and the second contact tip. The first contact tip and the second contact tip are configured to contact and deflect a wire towards the nozzle. The contact of the oppositely charged feedstock wires cause the wires to melt. A gas supply can be supplied to atomize and spray the molten metal onto a substrate.

In some embodiments, at least one of the first contact tip or the second contact tip may include a first end and a second end. The first end can include a front face and an opposing rear face. In some embodiments, the front face comprises a plurality of grooves for receiving a wire in one of the plurality of grooves. In some embodiments, the plurality of grooves are sequentially arranged around the front face. In some embodiments, the rear face comprises a plurality of notches. The second end of the contact tips may include an intrusion for receiving a tool. The tool is configured to rotate the first contact tip and the second contact tip to secure a protrusion in a notch of the plurality of notches on the rear face. In some embodiments, each of the first contact tip and the second contact tip comprise a disc comprising a first end and a second end. The first end comprises a front face and an opposing rear face and a plurality of grooves are disposed on the front face.

In some embodiments, at least one of the first contact tip or the second contact tip comprises a cylindrical rod having an outer surface. In some embodiments, the cylindrical rod comprises a plurality of grooves disposed on the outer surface of the cylindrical rod. The plurality of grooves are configured for contacting and guiding a wire. The cylindrical rod may further comprise a screw thread to adjust a position of the plurality of grooves disposed on the outer surface of the cylindrical rod. Each groove on the cylindrical rod may serve as a plurality of different wear surfaces for the wire as the rod is rotated. In some embodiments, the cylindrical rod includes a smooth contact surface. In some embodiments, the entire outer surface of the cylindrical rod includes a screw thread.

In some embodiments, the first contact tip and the second contact tip comprise a smooth contact surface. As used herein, the "contact surface" is the surface of the contact tip that contacts and guides the feedstock wire. In some embodiments, the surface of the contact does not include any grooves. The apparatus may include an actuator (e.g., a drive system) coupled to the first contact tip and the second tip to move or adjust the contact tip. For example, an actuator coupled to the first contact tip and the second tip can continuously or sequentially rotate the first contact tip, the second contact tip, or both. In some embodiments, the actuator can rotate the first contact tip and the second tip after a predetermined time of operation. For example, after the thermal spray apparatus operates for period of 1.5 hours, the actuator can automatically adjust the contact tip such that a new wear surface contacts the feedstock wire. In some aspects, the contact tips may comprise rods to guide the wire towards the nozzle. For example, the first contact tip and second tip may comprise a pair of rods for guiding the wire between the rods of the first contact tip and second tip such that the wire contacts the smooth surface.

Embodiments of the present disclosure provide a system for spraying atomized particles. The system includes a spray apparatus including a housing. A first electrode and a second electrode can be disposed in the housing. The second electrode can be spaced apart from the first electrode. The spray apparatus may include a first contact tip removably attached to the first electrode and a second contact tip removably attached second electrode. The position of the first contact tip and second contact tip is configured to be selectively adjusted on the first electrode and the second electrode. The spray apparatus can include a first channel adjacent the first electrode and a second channel adjacent the second electrode. The system includes a first feedstock wire configured to be fed through the first channel for contacting the first contact tip on the first electrode and a second feedstock wire configured to be fed through the second channel for contacting the second contact tip on the second electrode. The first contact tip and the second contact tip can be configured to contact and deflect the first wire and the second wire towards an intersection point adjacent the nozzle. The system may supply a high-velocity gas flow to atomize and spray the molten metal particles at the intersection point.

In some embodiments, the contact tip may comprise a cylindrical base and a contact surface. In some embodiments, the contact surface is planar and flat. In some embodiments, a chamfer is located between the cylindrical base and the contact surface. The chamfer may comprise an angle from 10° to 85°, e.g., 15° to 80°, 20° to 75°, 25° to 70°, 30° to 65°, or 35° to 60°. The chamfer may include a plurality of grooves. The plurality of grooves may be spaced around the circumference of the chamfer. In some embodiments, the plurality of grooves are equidistantly spaced on the chamfer. For example, each groove of the plurality of grooves can be spaced 1 mm to 50 mm from an adjacent groove. In some embodiments, the plurality of grooves are perpendicular to the contact surface of the contact tip. The grooves on the chamfer are configured to contact and deflect the feedstock wire towards the nozzle. The contact between the contact tip and the feedstock wire provides a charge to the feedstock wire. For example, if the contact tip is coupled to a positively charged electrode, the feedstock wire that is deflected by the contact tip will also be positively charged.

These and other embodiments are discussed below with reference to FIGS. 1-14; however, those skilled in the art will readily appreciate that the detailed description given herein with respect to these figures is for explanatory purposes only and should not be construed as limiting.

FIG. 1 provides a front perspective view of a thermal spray apparatus according to embodiments of the present invention. The thermal spray apparatus 100 includes a housing 105 for receiving feedstock wires (not shown). The housing 105 includes a first channel and a second channel for receiving a first feedstock wire and a second feedstock wire, respectively (shown in FIG. 2). In some embodiments, the thermal spray apparatus 100 can be an electric wire arc thermal spray apparatus. The arc spray coatings are produced via an electric arc produced across two feedstock wires which causes the wires to melt. A gas supply then atomizes the molten metal and propels it onto the surface, forming a coating.

Figure 2:
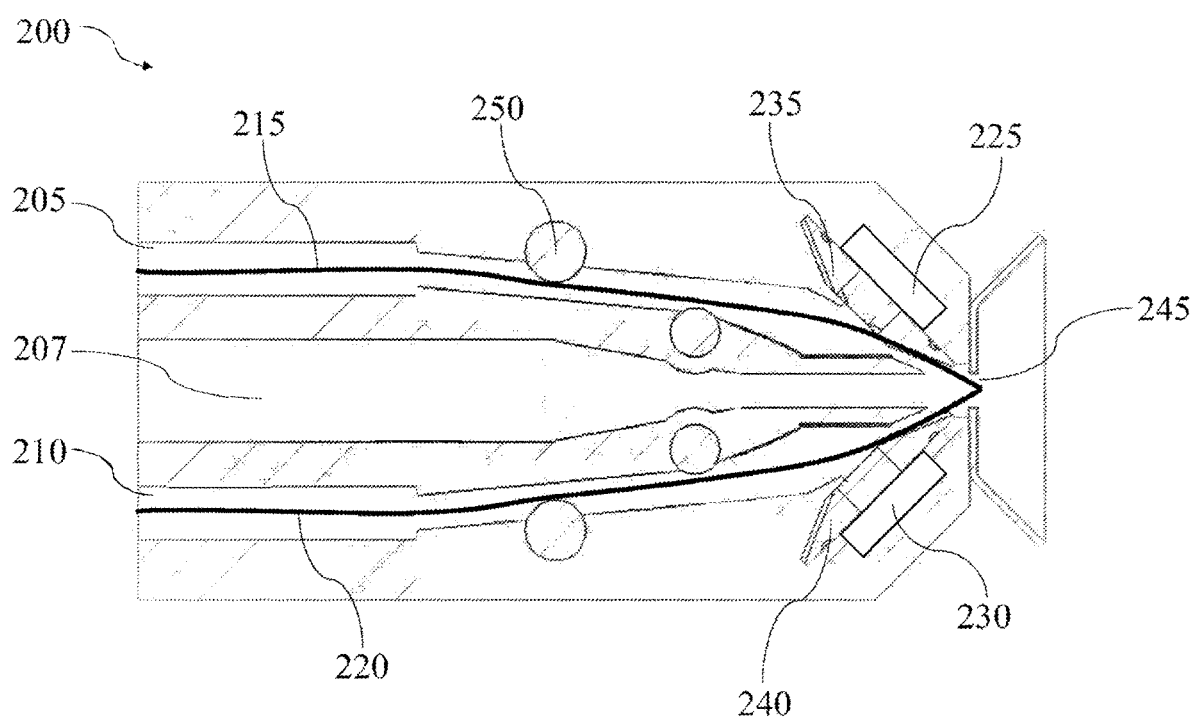
FIG. 2 shows an overhead cross-sectional view of the housing of the thermal spray apparatus according to embodiments of the present invention.

The housing 105 includes a face plate 110 that is disposed over the front end of the thermal spray apparatus 100. The face plate 110 provides angular surfaces to guide the atomized molten metal sprayed through the nozzle 115. In some embodiments, a first feedstock wire may be fed through a first channel and a second feedstock wire may fed through a second channel to an intersection point at the nozzle 115 to melt the feedstock wires. A gas supply atomizes the molten metal and propels it through the nozzle 115 onto a surface. The housing 105 further includes one or more contact tips (not shown) on the front end of the thermal spray apparatus 100. The one or more contact tips are removably attached to an electrode (as shown in FIG. 2). The one or more contact tips may include a plurality of wear surfaces for contact with the wire feedstock without necessitating any disassembly or part removal.

The one or more contact tips may be coupled to a secondary element including a tool-receiving element 120. In this embodiment, the rear face of the contact tip may be coupled to the tool-receiving element 120. The tool-receiving element 120 can receive a tool that is capable of adjusting (e.g., rotating) the contact tip. For example, the contact tips can be adjusted manually with a tool (e.g., turning a thumb wheel, screwdriver, or hex key tool). In this way, the contact tip can be selectively adjusted to provide a new wear surface for the feedstock wire. For example, a groove can wear over time from the deflection force of the wire. The contact tip can be rotated to provide a new groove, thus providing a new wear surface.

FIG. 2 shows an overhead view of the internal housing of the thermal spray apparatus 100 shown in FIG. 1. In some embodiments, the housing 200 may comprise a polymeric material. For example, the housing 200 can be produced from an injection-molded polyamide. The housing 200 includes a body having a first channel 205 and a second channel 210. The first channel 205 is configured to receive a first feedstock wire 215. The second channel 210 is configured to receive a second feedstock wire 220. The first channel 205 and second channel 210 may include a plurality of deflectors 250 to guide the first feedstock wire 215 and the second feedstock wire 220 through each respective channel to a nozzle 245. In some embodiments, the first channel 205 and the second channel 210 include a sleeve to guide the feedstock wires to the first contact tip 235 and the second contact tip 240. The first contact tip 235 is removably coupled to a first electrode 225 and the second contact tip 240 is removably coupled the second electrode 230. In some embodiments, different contact tips can be removably coupled to the electrodes. As used herein, "removably coupled" means that the contact tip can be attached or detached from the electrode.

In this embodiment, the first contact tip 235 and the second contact tip 240 contact and deflect the first feedstock wire 215 and the second feedstock wire 220 to establish a solid electrical contact with the feedstock wire. In some embodiments, the first electrode 225 and the second electrode 230 can be oppositely charged. The first contact tip 235 and second contact tip 240 deflect the first feedstock wire 215 and the second feedstock wire 220 to the nozzle 245 at an intersection point at the nozzle 245 to melt the feedstock wire. The first contact tip 235 and second contact tip 240 serve to guide each of the first feedstock wire 215 and the second feedstock wire 220, respectively, so that the point of intersection is well controlled for effective atomization of molten metal produced in the electric arc between the two feedstock wires. In some embodiments, a gas stream is accelerated through the gas flow channel 207 (e.g., at sonic or supersonic flow conditions) immediately upstream of the point of intersection of the first feedstock wire 215 and a second feedstock wire 220 at the nozzle 245 further enhancing atomization characteristics. Due to the opposing charges of the electrodes that are coupled to the first contact tip 235 and the second contact tip 240, the feedstock wires produce an electric arc (e.g., short circuit) at the nozzle 245.

As shown in FIG. 2, a gas flow channel 207 is provided in the housing 200 of the spray apparatus. The gas flow channel 207 can receive a high-velocity gas flow for atomizing and spraying the molten particles produced from the feedstock wires. Advantageously, the design of the contact tips in the housing does not impede the upstream high-velocity gas flow as it approaches the intersection of the feedstock wires for atomization. The high-velocity gas flow is beneficial for fine atomization and a uniform jet of particles. Thus, the spray apparatus achieves unexpected uniform high performance atomization, which improves the quality of the cladding applied to a substrate. In some embodiments, the contact tips can be can be close to the intersection point of the feedstock wires without disturbing gas flow, thereby promoting wire stability.

Figure 3:
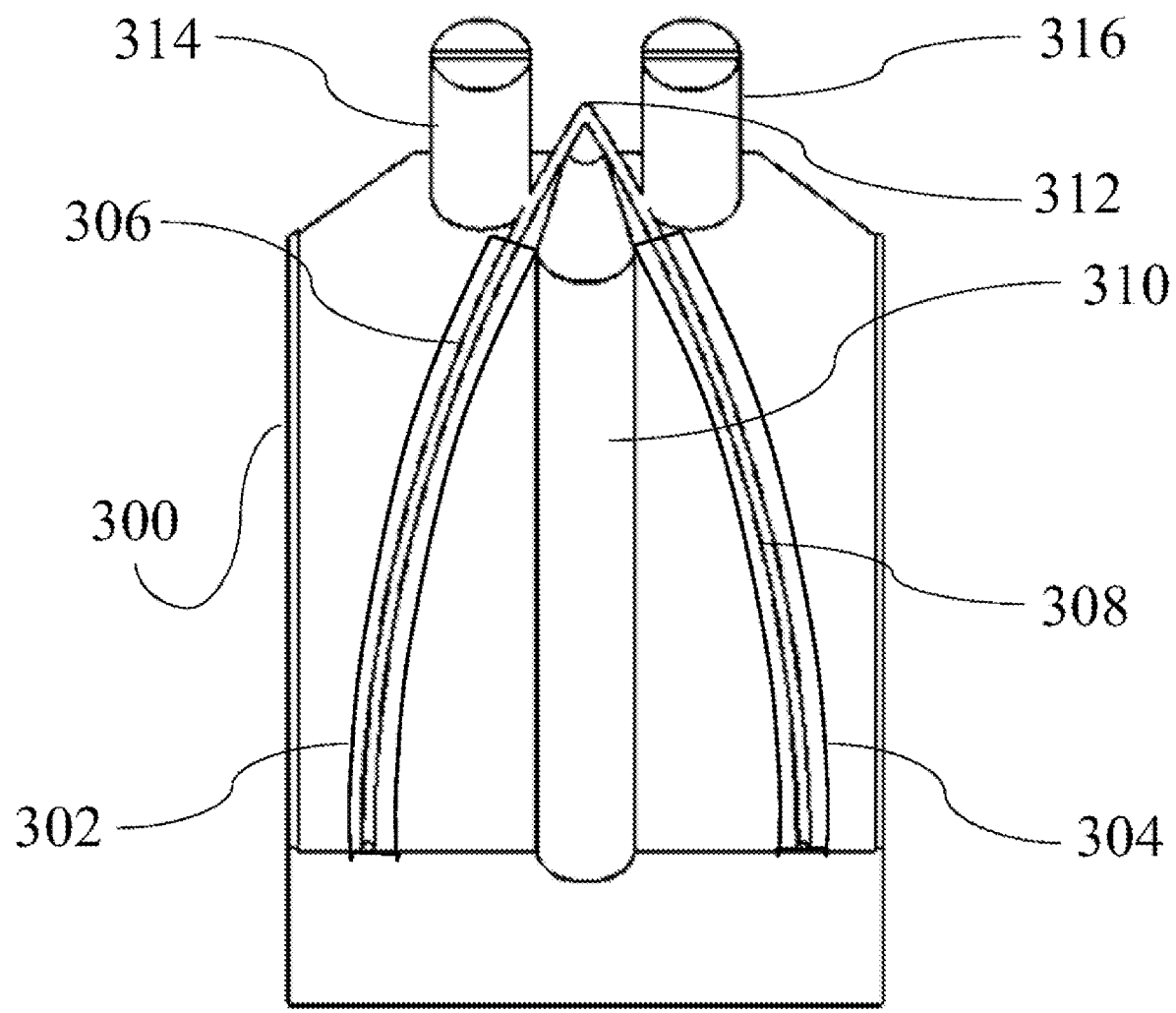
FIG. 3 shows an overhead view of rod-shaped contact tips in the housing of the thermal spray apparatus according to some embodiments.

FIG. 3 shows an overhead view of rod-shaped contact tips in the housing of the thermal spray apparatus according to some embodiments. The housing 300 includes a first channel 302 and a second channel 304. The first channel 302 is configured to receive a first feedstock wire 306 and the second channel 304 is configured to receive a second feedstock wire 308. The first feedstock wire 306 and the second feedstock wire 308 are guided through the each of the channels to a nozzle of the thermal spray apparatus. The housing 300 includes an air-jet channel 310 that is centrally located on the housing 300. For example, the air-jet channel 310 may extend along a centerline of the housing 300 to the nozzle. The air-jet channel 310 can receive a gas supply that is supplied to an intersection point 312 of the first feedstock wire 306 and the second feedstock wire 308.

The housing 300 incudes a first contact tip 314 and a second contact tip 316. The first contact tip 314 and the second contact tip 316 may be adjacent the front end of the housing. In some embodiments, the first contact tip 314 and the second contact tip 316 are rod-shaped contact tips. The first contact tip 314 and the second contact tip 316 may include a plurality of contact surfaces for each of the feedstock wires. For example, the first contact tip 314 and the second contact tip 316 may include a plurality of grooves for receiving a feedstock wire therein. As shown in FIG. 2, each of the first contact tip 314 and the second contact tip 316 deflect the first feedstock wire 306 and the second feedstock wire 308, respectively, towards the nozzle (not shown) at the intersection point 312 of the wires. The first contact tip 314 may be coupled to a first electrode and the second contact tip 316 may be coupled to a second electrode. The first electrode and second electrode provide opposite charges to each of the feedstock wires to short circuit the wires at the intersection point 312. In some embodiments, the first electrode is an anode and the second electrode is a cathode. The first contact tip 314 and second contact tip 316 serve to guide the feedstock wire so that the intersection point 312 is well controlled for effective atomization of molten metal produced in the electric arc between the two feedstock wires. Due to the opposing charges of the electrodes that are coupled to the first contact tip 314 and the second contact tip 316, the feedstock wires form an electric arc (e.g., short circuit) at the nozzle. The high-velocity gas supply then atomizes the molten metal and propels it onto the surface to produce a coating.

Figure 4A:
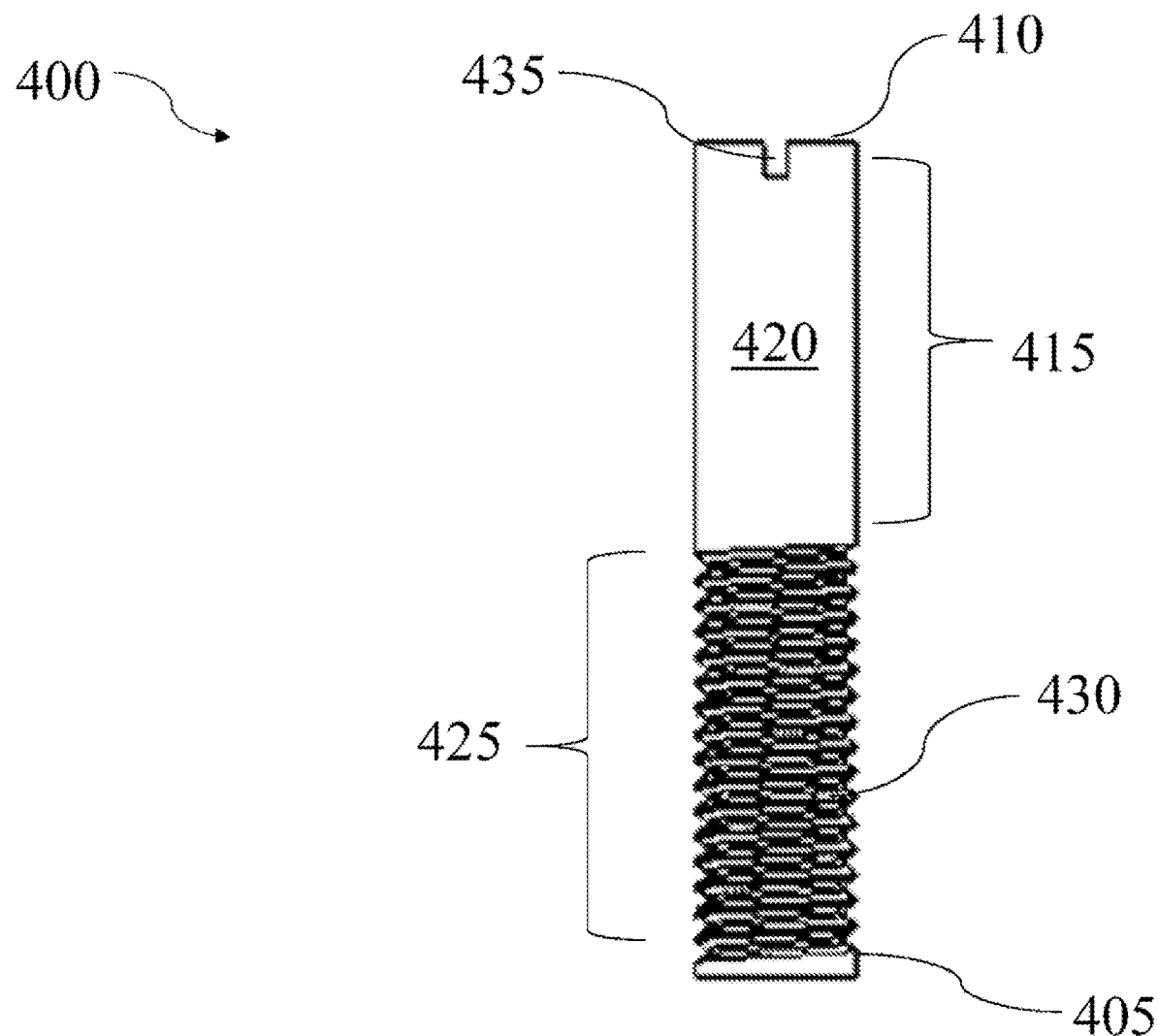
FIGS. 4A-4C shows a rod-shaped contact tip according to some embodiments of the present invention.

FIG. 4A shows a contact tip according to some embodiments. In some embodiments, the contact tip 400 may be a rod-shaped contact tip. For example, the contact tip 400 may be substantially cylindrical. The contact tip 400 may include a first end 405 and a second end 410. The contact tip 400 may include a first region 415 comprising a contact surface 420 adjacent the second end 410 and a second region 425 comprising a screw thread 430 adjacent the first end 405. The second end 410 may include a tool-receiving feature 435. In some embodiments, the tool-receiving feature 435 can be a divot for receiving a tool (e.g., a flathead-screw driver). The tool-receiving feature 435 is configured to receive a tool for adjusting the location of the contact surface 420 of the contact tip 400 on the housing of the thermal spray apparatus. For example, when the contact surface 420 that is deflecting and contacting a feedstock wire begins to wear, the contact tip 400 can be adjusted via the tool-receiving feature 435 to provide a new contact surface for the feedstock wire.

Figure 4B:
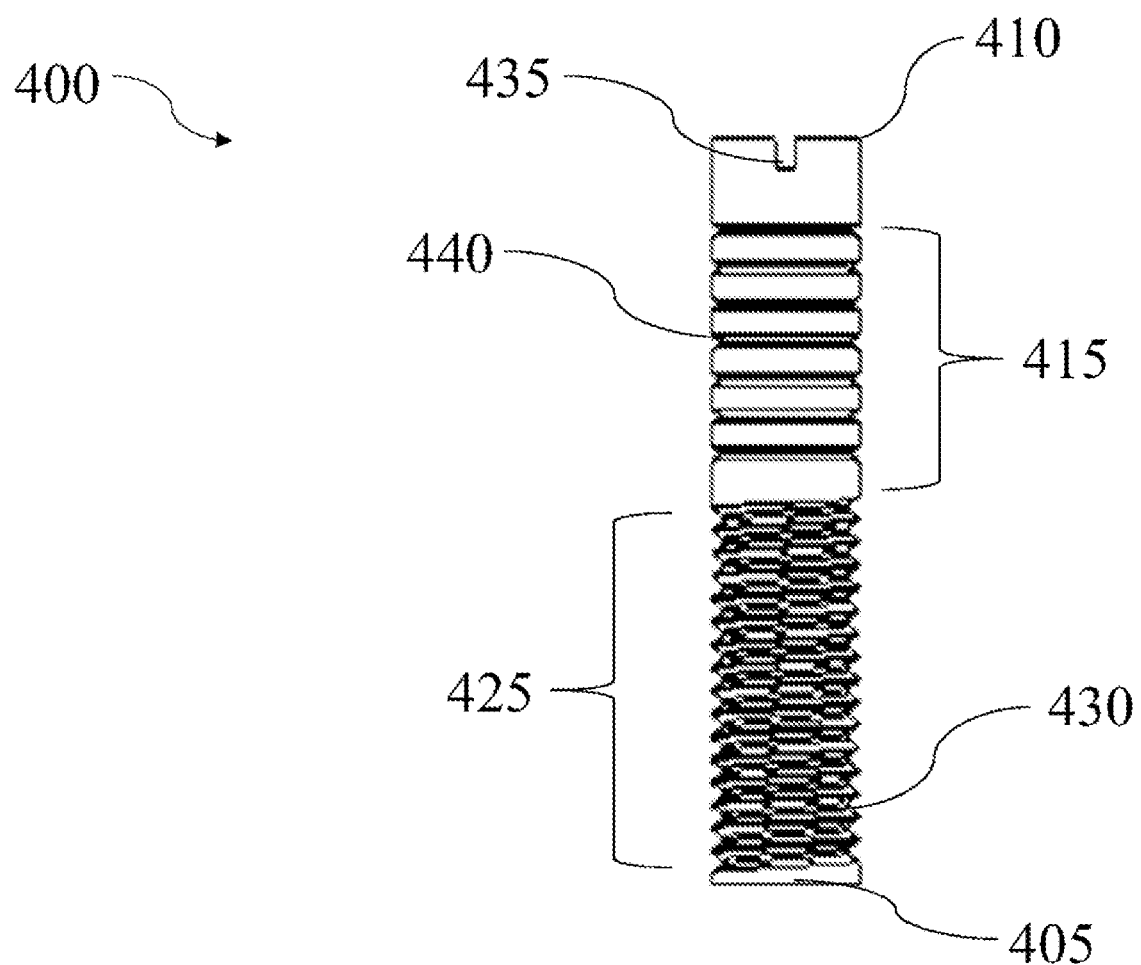

FIG. 4B shows another embodiment of a rod-shaped contact tip according to some embodiments. In this embodiment, the first region 415 includes a contact surface including a plurality of grooves 440. The plurality of grooves 440 can be located from a middle region of the contact tip 400 to the second end 410. Each groove of the plurality of grooves 440 is configured to receive a feedstock wire. The grooves 440 provide a surface for contacting and deflecting the feedstock wire. The feedstock wire may be held in place on the contact tip 400 via the grooves 440 to limit movement. When the surface within each groove begins to wear, the contact tip 400 can be adjusted via the tool-receiving feature 435 to provide a new groove of the plurality of grooves 440 for contacting the feedstock wire.

Figure 4C:
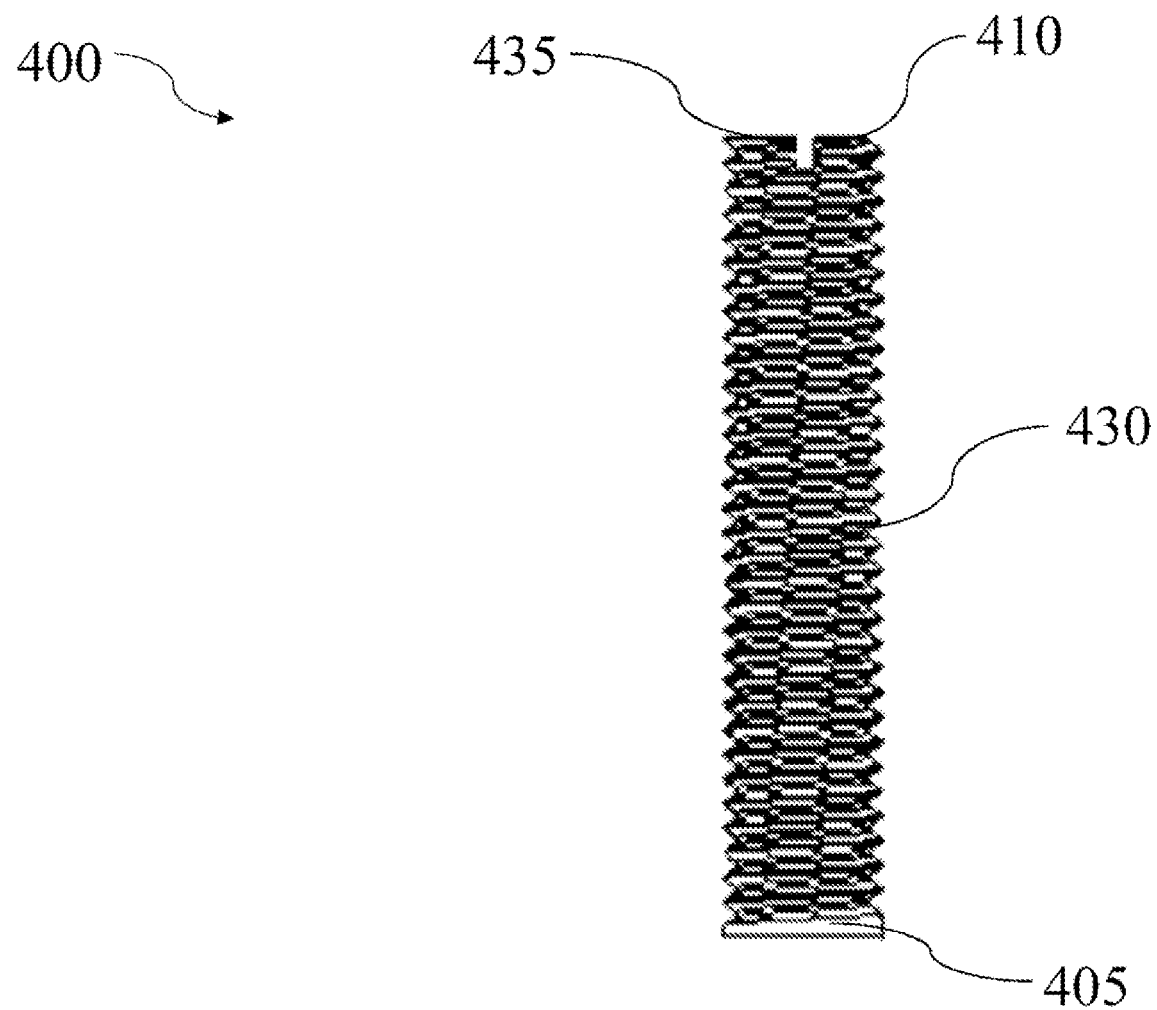

In some embodiments, the contact tip 400 may not include a screw thread. In this embodiment, the entire circumferential outer surface of the contact tip may include grooves 440. The contact tip 400 may be automatically adjusted using a driver to provide a new groove after a period of time (e.g., at least 10 minutes) or an amount of wear. For example, the driver can continuously rotate the contact tips for uniform wear on the exterior surface. In some embodiments, the contact tip 400 can have a smooth surface without any grooves. FIG. 4C shows another embodiment of a rod-shaped contact tip according to some embodiments. In this embodiment, the entire surface of the contact tip 400 includes a screw thread 430. A portion of the screw thread 430 can serve as grooves for receiving the feedstock wire.

Figure 5:
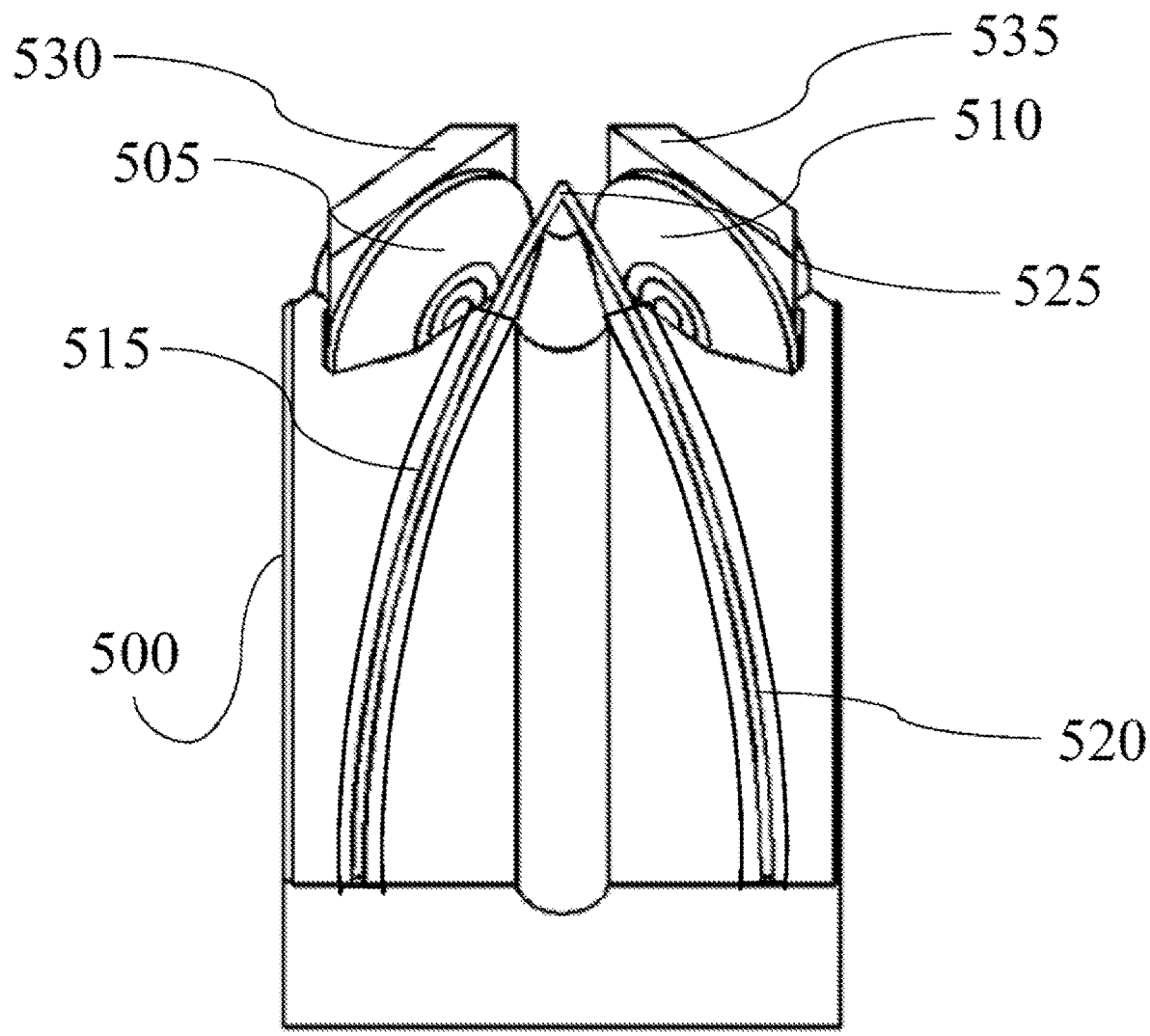
FIG. 5 shows an overhead view of disc-shaped contact tips in the housing of the thermal spray apparatus according to some embodiments.

FIG. 5 shows an overhead view of disc-shaped contact tips in the housing of the thermal spray apparatus according to some embodiments. This embodiment is similar to the embodiment of FIG. 3, but includes different contact tips. The housing 500 incudes a first contact tip 505 and a second contact tip 510. In some embodiments, the first contact tip 505 and the second contact tip 510 are disc-shaped contact tips. The first contact tip 505 and the second contact tip 510 may include a plurality of contact surfaces for each of the feedstock wires. As shown in FIG. 5, each of the first contact tip 505 and the second contact tip 510 deflect the first feedstock wire 515 and the second feedstock wire 520, respectively, towards the nozzle (not shown) at the intersection point 525 of the wires. The first contact tip 505 may be coupled to a first electrode 530 and the second contact tip 510 may be coupled to a second electrode 535. The first electrode 530 and second electrode 535 provide opposite charges to each of the feedstock wires to short circuit the wires at the intersection point 525.

In this embodiment, each of the first contact tip 505 and the second contact tip 510 may removably attached to the first electrode 530 and the second electrode 535, respectively. The contact tips can be coupled to each electrode to provide a charge to the feedstock wire that is supplied through the thermal spray apparatus. The first electrode 530 and the second electrode 535 can be angled with respect to the first feedstock wire 515 and the second feedstock wire 520 to provide contact with the first contact tip 505 and the second contact tip 510. For example, each of the first electrode 530 and the second electrode 535 may at an acute angle with respect to the latitudinal centerline of the housing 500. The angle of the first electrode 530 and the second electrode 535 provide for contact between the feedstock wires and the contact tips. It is contemplated that the angle of the electrodes may depend on the shape of the contact tips.

In some embodiments, the first electrode 530 and the second electrode 535 are oppositely charged. In some embodiments, the first electrode 530 can be positively charged electrode and the second electrode 535 can be a negatively charged electrode. The electrodes can be coupled to a cable that provides current to the electrode. Each of the contact tips coupled to each electrode provides a charge to the feedstock wire that is supplied through the thermal spray apparatus.

Figure 6A:
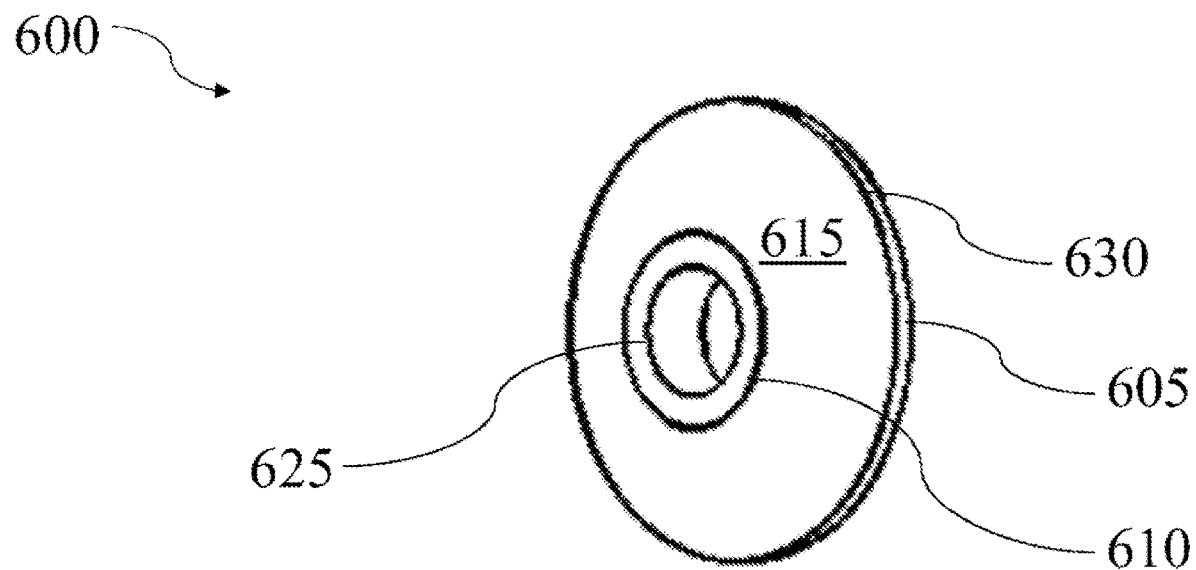
FIGS. 6A and 6B shows a disc-shaped contact tip according to some embodiments of the present invention.
Figure 6B:
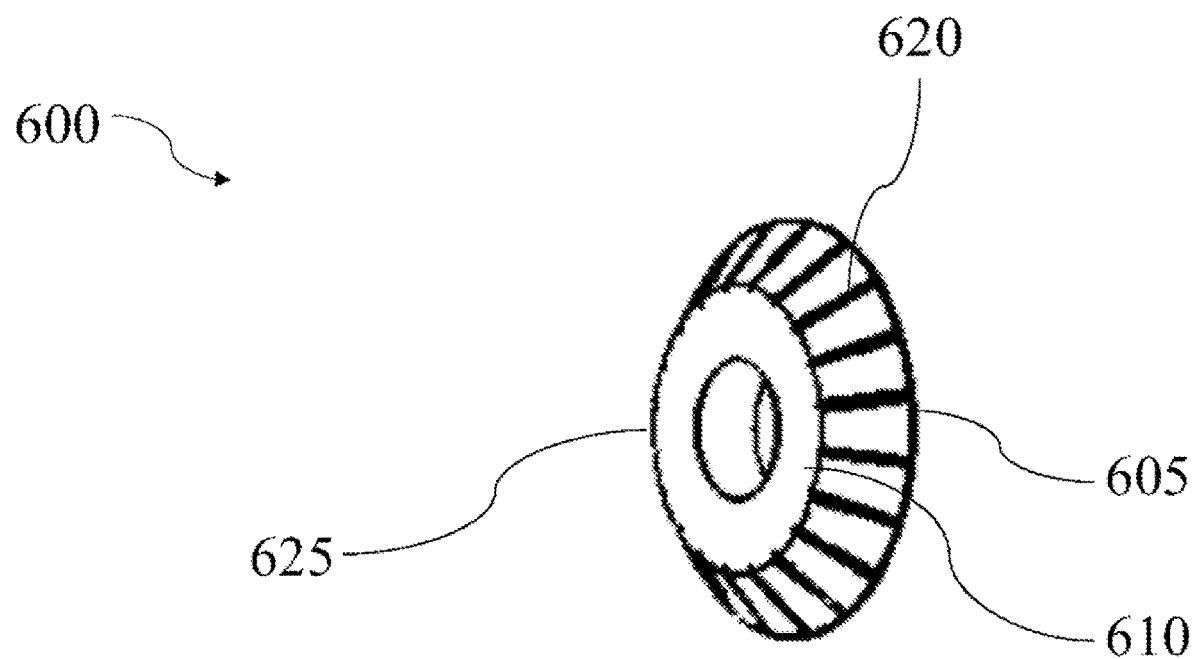

FIGS. 6A and 6B show another contact tip according to some embodiments. In some embodiments, the contact tip 600 may be shaped as a truncated cone. For example, the contact tip 600 may include a base portion 605 and a top portion 610. The base portion 605 and the top portion 610 may each be circular. The base portion 605 may have a larger circumferential area than the top portion 610. In some embodiments, the top portion 610 may have a smaller radius than the base portion 605. The distance between the centers of the base portion 605 and the top portion 610 is the height of the truncated cone. The base portion 605 may include a height that provides a bevel 630 around the circumference of the contact tip 600. The contact tip 600 includes a contact surface 615 (e.g., a lateral surface) extending from the outer edge of the base portion 605 to the top portion 610. The contact surface 615 may be the area of the contact tip 600 configured to contact and deflect a feedstock wire. In some embodiments, the contact tip 600 includes a central orifice 625.

FIG. 6A shows that the contact tip 600 comprises a smooth contact surface 615. For example, the first contact tip and the second contact tip may comprise a smooth contact surface that does not include any grooves. The thermal spray apparatus may include an actuator (e.g., a drive system) coupled to the contact tip to move or adjust the contact tip. For example, an actuator coupled to the first contact tip and the second tip can continuously or sequentially rotate the first contact tip, the second contact tip, or both. In some embodiments, the actuator can rotate the contact tip after a predetermined time of operation. For example, after the thermal spray apparatus operates for period of 1.5 hours, the actuator can automatically adjust the contact tip such that a new wear surface contacts the feedstock wire.

As shown in FIG. 6B, the contact surface 615 may include a plurality of grooves 620. The plurality of grooves 620 can extend from the base portion 605 to the top portion 610. Each groove of the plurality of grooves 620 is configured to receive a feedstock wire. The grooves 620 provide a surface for contacting and deflecting the feedstock wire. The feedstock wire may be held in place on the contact tip 600 via the grooves 620 to limit angular movement. When the surface within each groove begins to wear, the contact tip 600 can be adjusted to provide a new groove of the plurality of grooves 620 for contacting the feedstock wire.

Figure 7A:
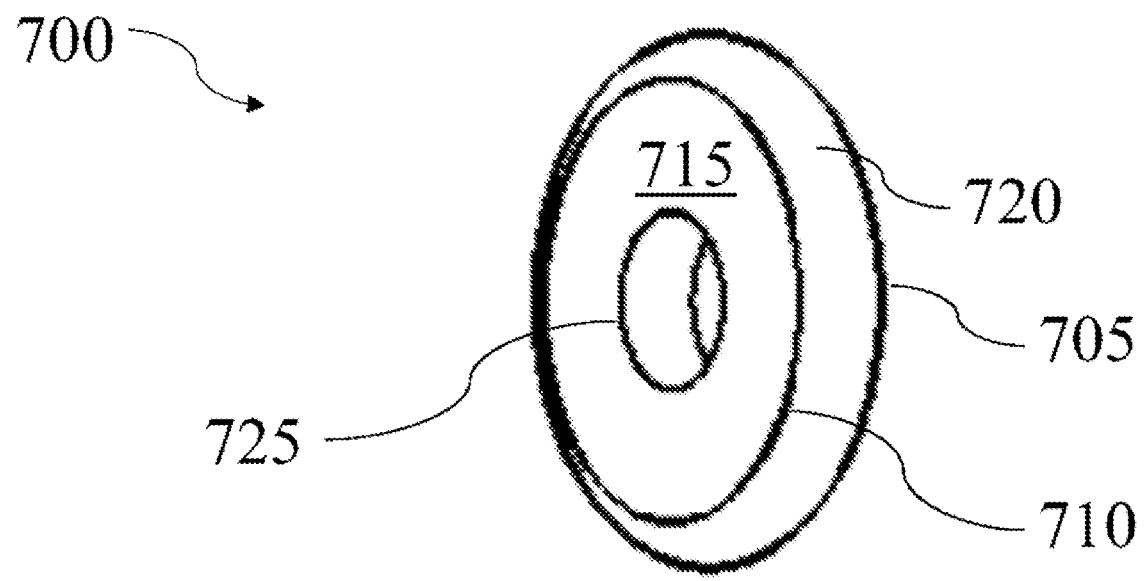
FIGS. 7A and 7B shows another disc-shaped contact tip according to some embodiments of the present invention.
Figure 7B:
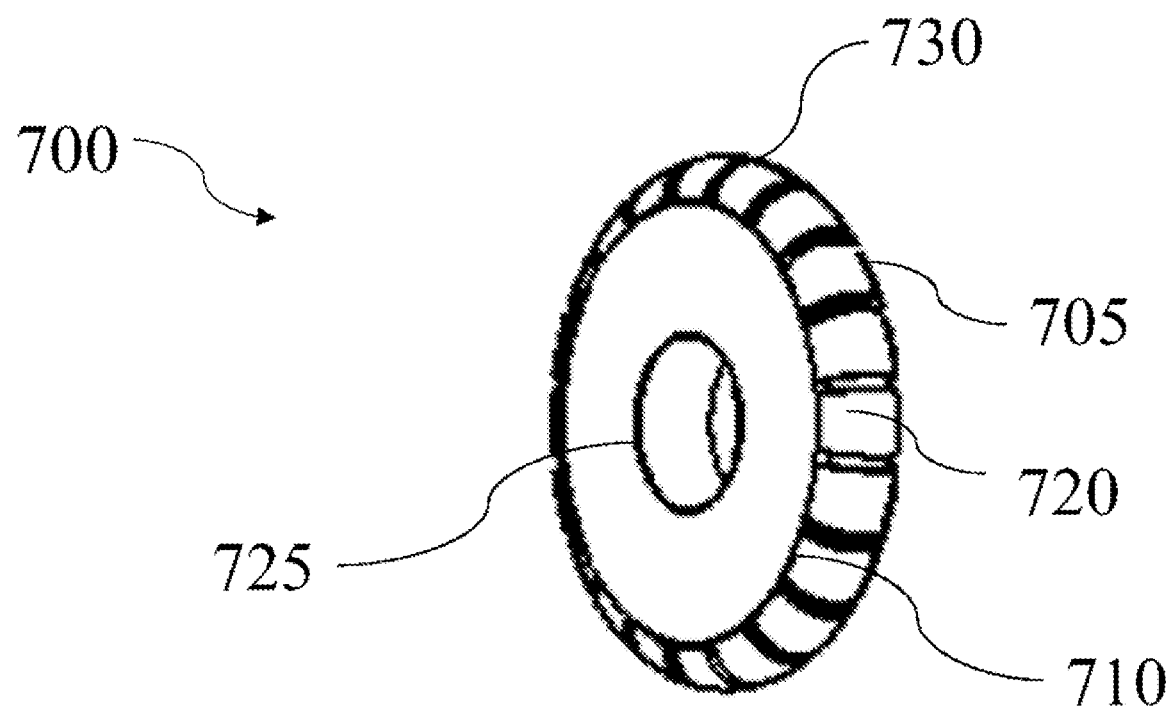

FIGS. 7A and 7B show another contact tip according to some embodiments. In some embodiments, the contact tip 700 may be in the shape of a toroid (e.g., a torus). For example, the contact tip 700 may be a square toroid, a toroidial polyhedron, or a circular toroid. In the embodiments shown in FIGS. 7A and 7B, the contact tip 700 includes a base portion 705 and a top portion 710. Each of the base portion 705 and the top portion 710 may be circular. In some embodiments, the base portion 705 and the top portion 710 comprise surfaces 715 that are substantially parallel to one another. For example, the base portion 705 and the top portion 710 may include planar surfaces that are parallel. The area of the planar surfaces of the base portion 705 and the top portion 710 may be the same. In some embodiments, the base portion 705 has a larger area than the top portion 710. The contact tip 700 may include a central orifice 725 that extends from the base portion 705 to the top portion 710.

The contact tip 700 may include a curved surface 720 extending between the base portion 705 and the top portion 710. The curved surface 720 may serve as a bevel between the base portion 705 and the top portion 710. The curved surface 720 provides a contact surface for a feedstock wire. As shown in FIG. 7B, the curved surface 720 may include a plurality of grooves 730. The feedstock wire may be held in place on the contact tip 700 via the grooves 730 to limit movement. When the surface within each groove begins to wear, the contact tip 700 can be rotated to provide a new groove of the plurality of grooves 730 for contacting the feedstock wire.

In the embodiment of FIGS. 7A and 7B, the electrodes can be angled in any orientation with respect to the feedstock wires. Due the curved outer surface 720, the contact tip 700 can contact and deflect the feedstock wire.

Figure 8:
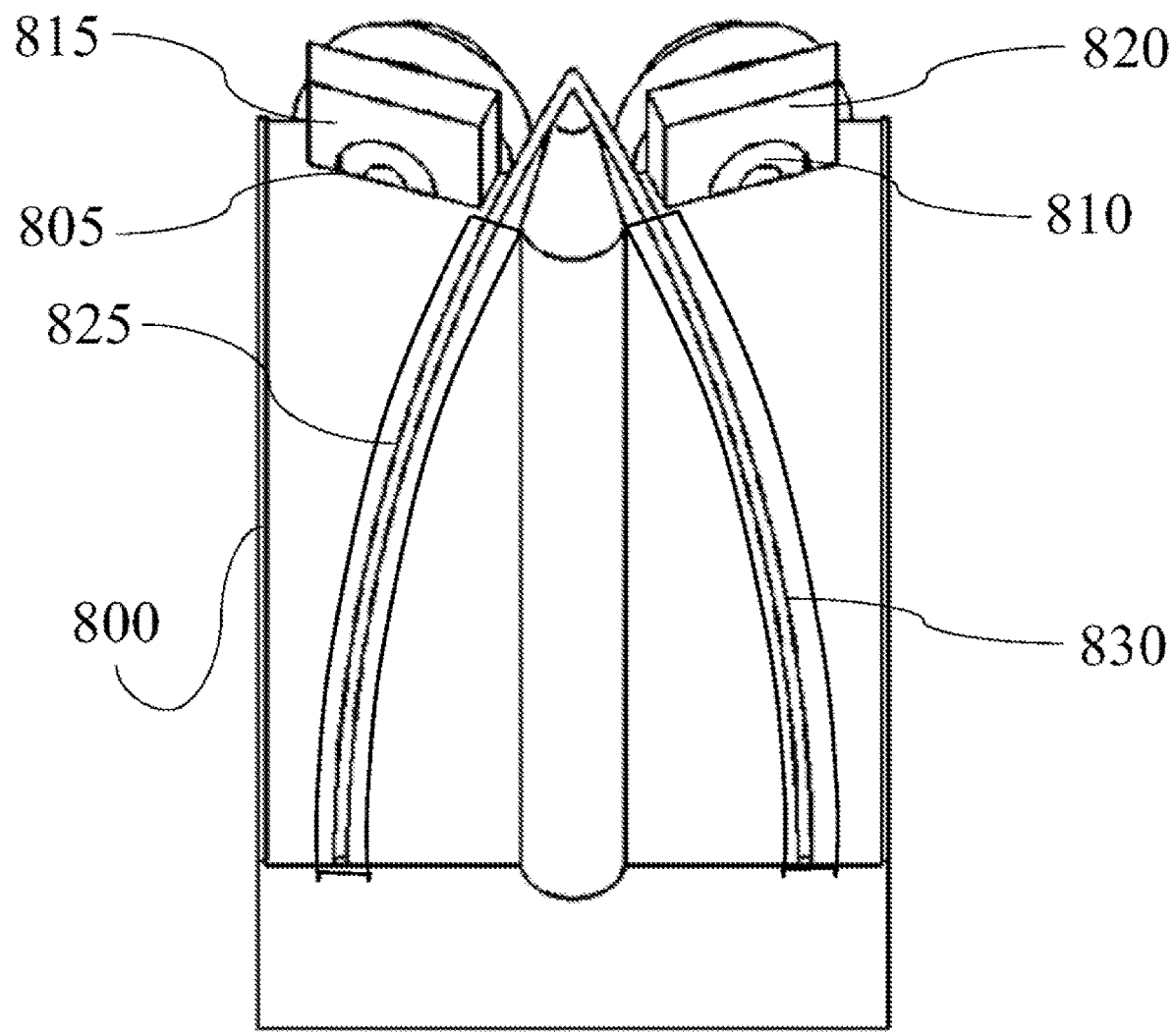
FIG. 8 shows an overhead view of disc-shaped contact tips in the housing of the thermal spray apparatus according to some embodiments of the present invention.

FIG. 8 shows an overhead view of another embodiment of the contact tip in the housing of the thermal spray apparatus according to some embodiments. This embodiment is similar to the embodiment of FIG. 5, but includes different contact tips. The housing 800 incudes a first contact tip 805 and a second contact tip 810. The first contact tip 805 and the second contact tip 810 may removably attached to a first electrode 815 and a second electrode 820, respectively. The first contact tip 805 and a second contact tip 810 can be coupled to the first electrode 815 and the second electrode 820 to provide a charge to the feedstock wires 825, 830 that is supplied through the housing 800. The first electrode 815 and the second electrode 820 can be angled with respect to the first feedstock wire 825 and the second feedstock wire 830 to provide contact with the first contact tip 805 and the second contact tip 810. For example, each of the first electrode 815 and the second electrode 820 may be at an obtuse angle (e.g., greater than) 90° with respect to the latitudinal centerline of the housing 800. The angle of the first electrode 815 and the second electrode 820 provide for contact between the feedstock wires and the contact tips.

Figure 9A:
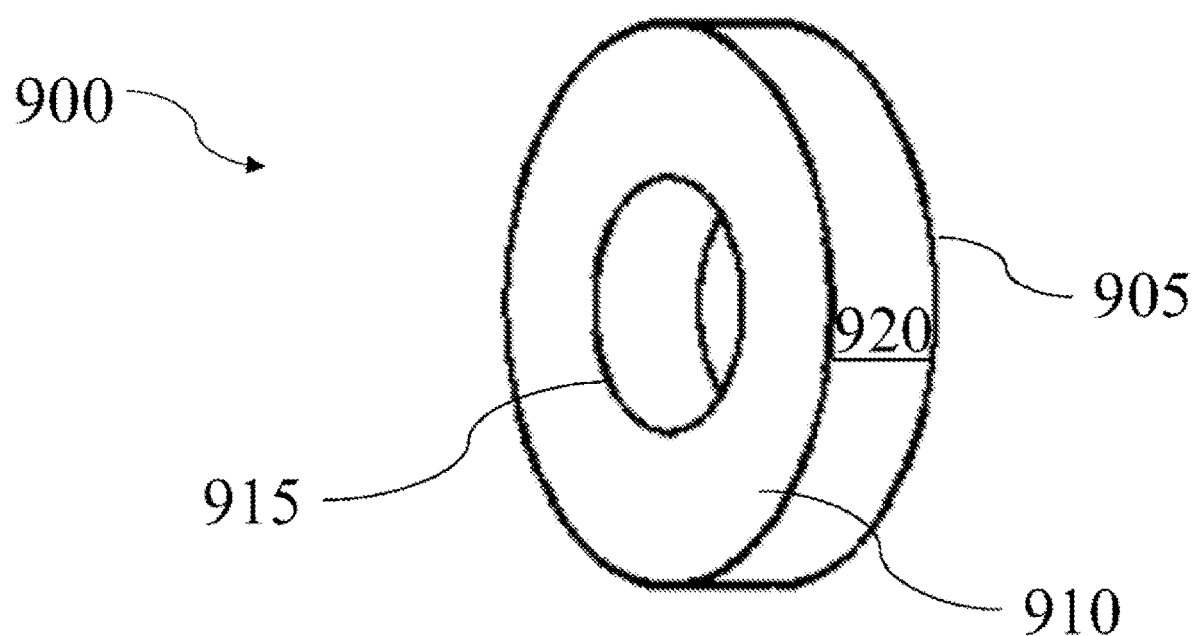
FIGS. 9A and 9B shows a toroid-shaped contact tip according to some embodiments of the present invention.
Figure 9B:
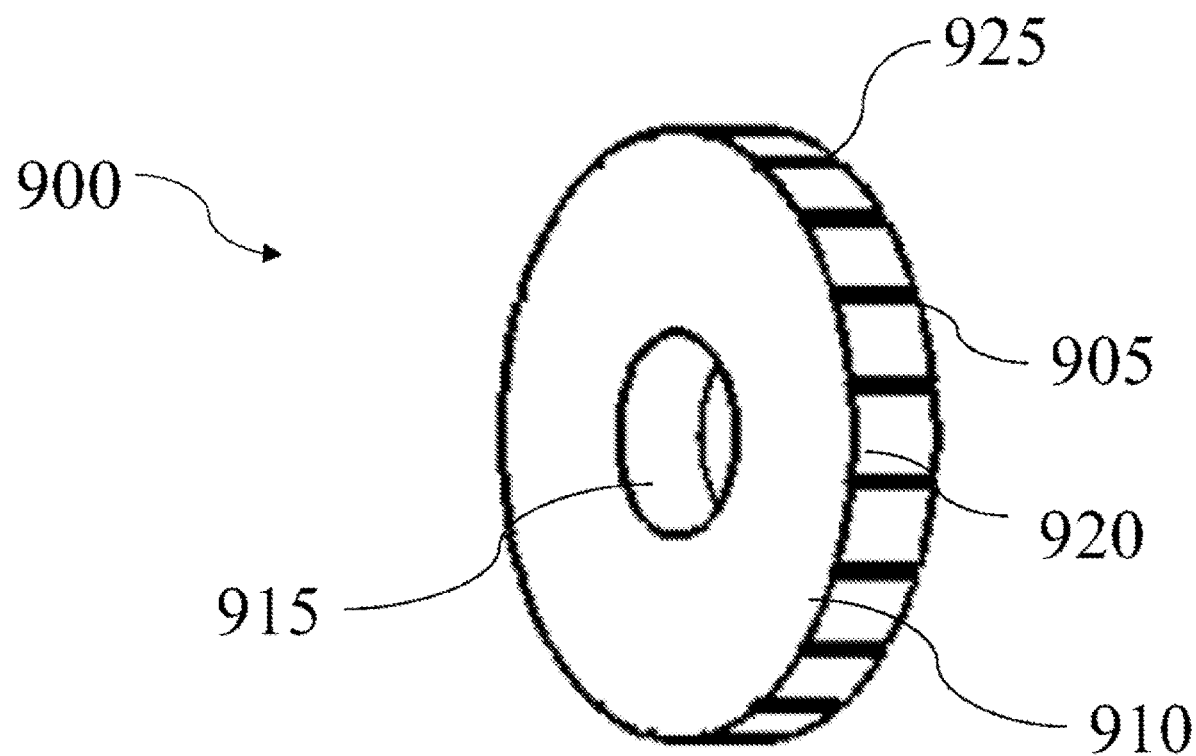

FIGS. 9A and 9B show contact tips according to some embodiments that can be used in the housing 800 of FIG. 8. In this embodiment, the contact tip 900 has a shape of a square toroid. The contact tip 900 includes a base portion 905 and a top portion 910. The surface of the base portion 905 and the top portion 910 may be substantially planar and parallel. The contact tip 900 includes a central orifice 915 extending from the base portion 905 and a top portion 910. The contact tip 900 includes a contact surface 920 that corresponds to the region between the base portion 905 and the top portion 910. In some embodiments, the contact surface 920 is the outer edge of the contact tip 900. As shown in FIG. 9B, the contact surface 920 may include a plurality of grooves 925 for receiving a feedstock wire.

Figure 10:
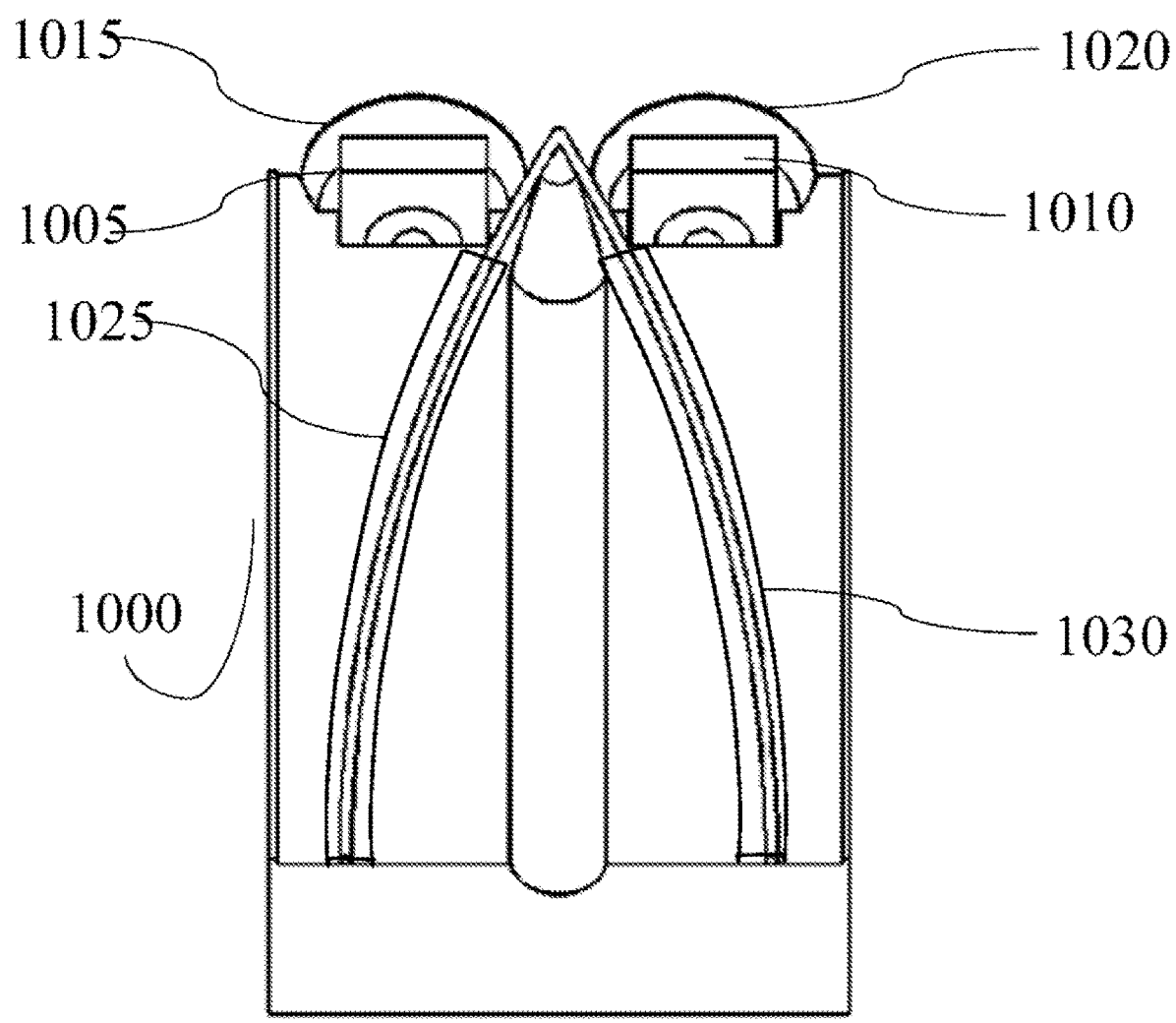
FIG. 10 shows an overhead view of truncated cone-shaped contact tips in the housing of the thermal spray apparatus according to some embodiments of the present invention.

FIG. 10 shows an overhead view of another embodiment of the contact tip in the housing of the thermal spray apparatus according to some embodiments. This embodiment is similar to the embodiment of FIG. 8, but includes different contact tips. The housing 1000 incudes a first contact tip 1005 and a second contact tip 1010. The first contact tip 1005 and the second contact tip 1010 may removably attached to a first electrode 815 and a second electrode 1020, respectively. The first contact tip 1005 and a second contact tip 1010 can be coupled to the first electrode 1015 and the second electrode 1020 to provide a charge to each of the first feedstock wire 1025 and the second feedstock wire 1030 as the wires travel through the housing 1000. The first electrode 1015 and the second electrode 1020 can be angled with respect to the first feedstock wire 1025 and the second feedstock wire 1030 to provide contact with the first contact tip 1005 and the second contact tip 1010. For example, each of the first electrode 1015 and the second electrode 1020 may be substantially perpendicular (e.g., about) 90° to the latitudinal centerline of the housing 1000. The angle of the first electrode 1015 and the second electrode 1020 provide for contact between the feedstock wires and the contact tips shown and described in FIGS. 11A and 11B.

Figure 11A:
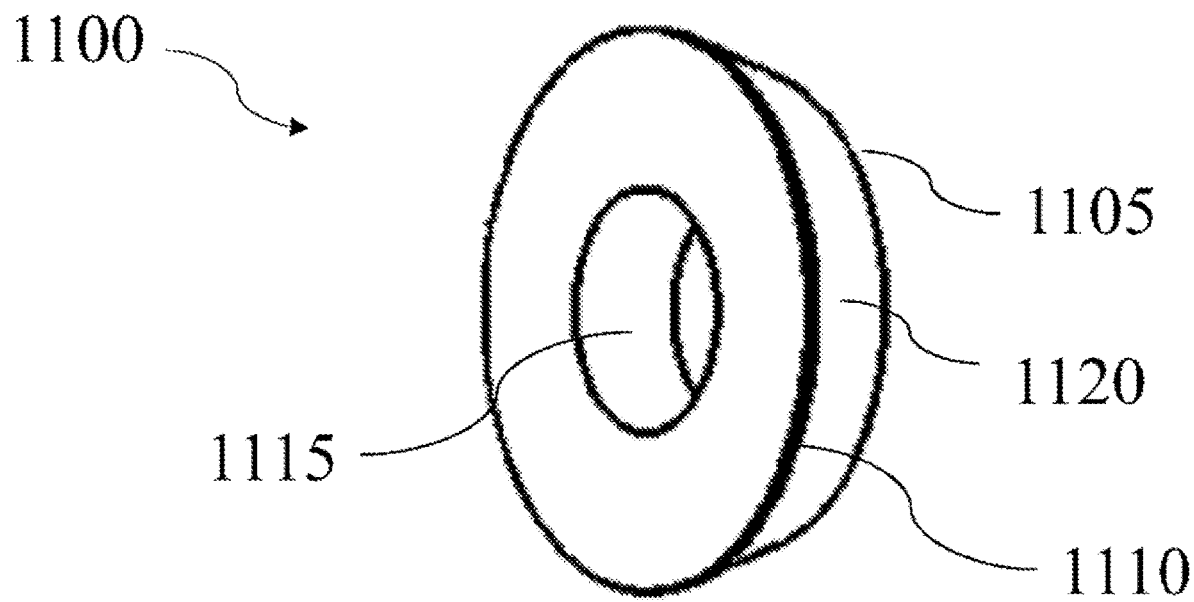
FIGS. 11A and 11B show an truncated cone-shaped contact tip according to some embodiments of the present invention.
Figure 11B:
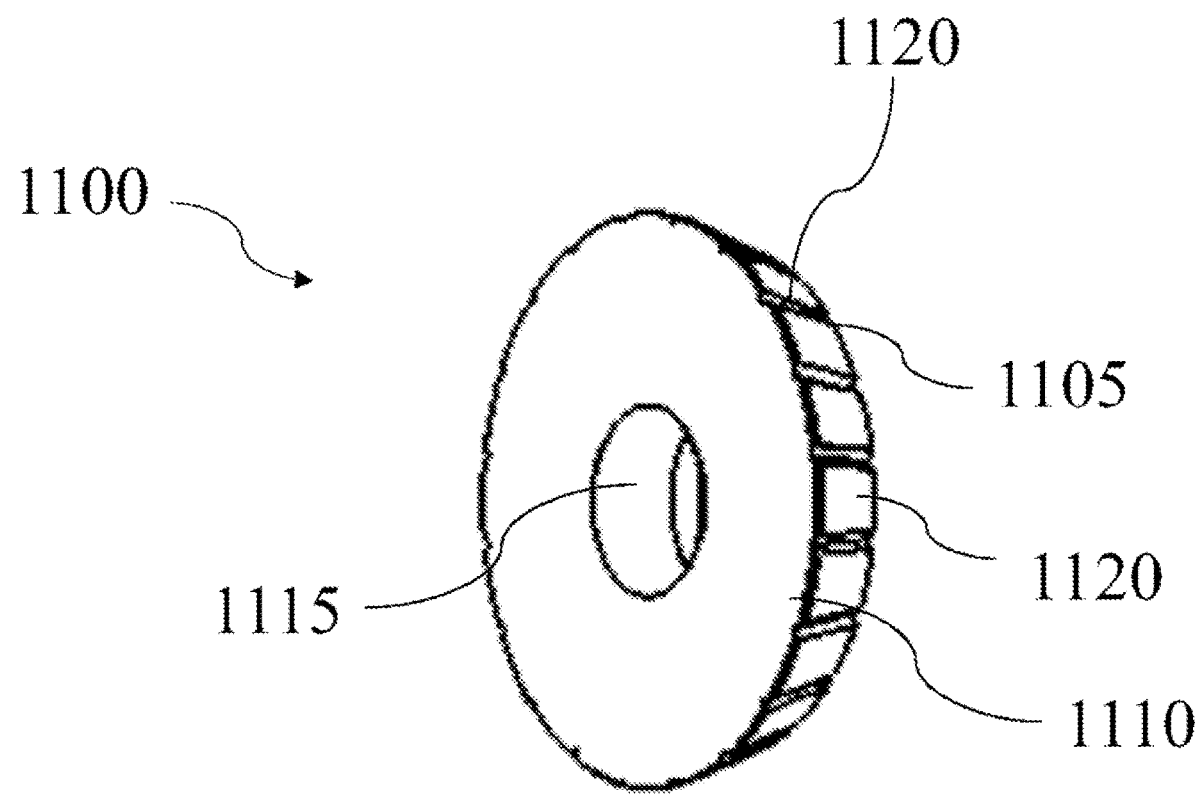

FIGS. 11A and 11B show contact tips according to some embodiments that can be used in the housing 1000 of FIG. 10. In this embodiment, the contact tip 1100 has a shape of an inverted truncated cone. The contact tip 1100 includes a base portion 1105 and a top portion 1110. The base portion 1105 and the top portion 1110 may each be circular. The base portion 1105 may have a smaller circumferential area than the top portion 1110. In some embodiments, the top portion 1110 may have a large radius than the bass portion 1105. The distance between the base portion 1105 and the top portion 1110 is height of the contact tip 1100. The surface of the base portion 1105 and the top portion 1110 may be substantially planar and parallel. The contact tip 1100 includes a central orifice 1115 extending from the base portion 1105 through the top portion 1110. The contact tip 1100 includes a contact surface 1120 that corresponds to the region (e.g., a lateral surface) extending from the outer edge of the base portion 1105 to the top portion 1110. As shown in FIG. 11B, the contact surface 1120 may include a plurality of grooves 1125 for receiving a feedstock wire.

Figure 12A:
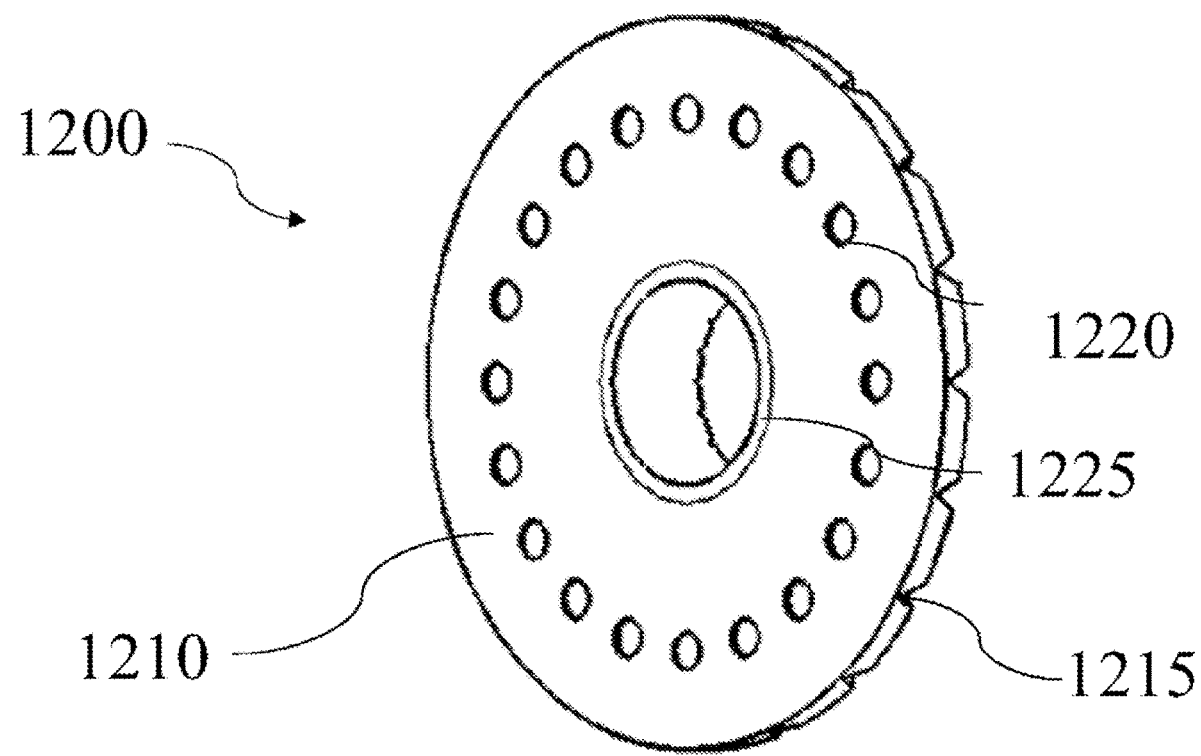
FIGS. 12A and 12B shows a rear face of a contact tip including indexable divots for receiving a protrusion according to some embodiments of the present invention.

FIG. 12 shows a rear face of a contact tip according to some embodiments. In some embodiments, the contact tip 1200 comprises a front face (not shown) and a rear face 1210. The front face 1205 may include a plurality of grooves 1215 for receiving a feedstock wire. The plurality of grooves are configured to contact and guide (e.g., deflect) the feedstock wire towards an intersection point adjacent the nozzle. In the embodiment shown in FIG. 12A, the rear face 1210 of the contact tip includes an orifice 1225 for receiving an element comprising a tool-receiving element. The tool-receiving element can receive a tool that is capable of rotating the contact tip 1200. For example, the contact tips can be adjusted manually with a tool (e.g., turning a thumb wheel, screwdriver, or hex key tool). In this way, the contact tip 1200 can be selectively adjusted to provide a new wear surface for the feedstock wire. For example, a groove can wear over time from the deflection force of the wire. The contact tip 1200 can be rotated to provide a new groove, thus providing a new wear surface. The apparatus and system described herein enables adjusting the contact tips in the apparatus to provide new contact and guide surfaces for the wire feedstock without any need for part removal, wire adjustment or replacement.

Figure 12B:
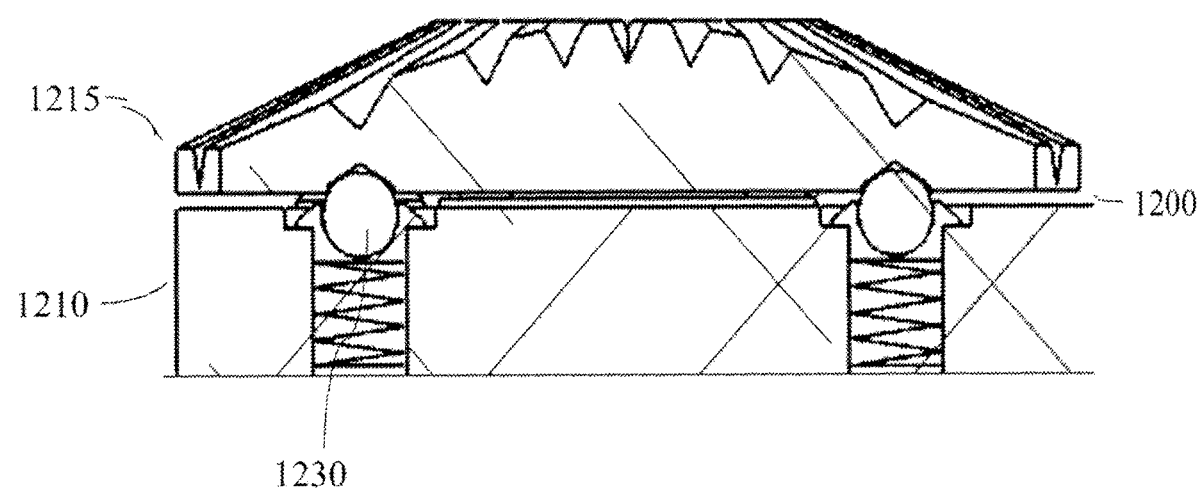

In some embodiments, the contact tip 1200 can be disc-shaped. The disc-shaped contact tip 1200 can be rotationally indexable to present a new radial or grooved surface for the feedstock wire fed through the thermal spray apparatus. For example, FIG. 12A shows a rear face 1210 of a contact tip including a plurality of divots 1220. The divots 1220 may provide positive feedback to a user when selectively adjusting the contact tip 1200. For example, FIG. 12B shows that when a tool is inserted in the intrusion in the rear face 1210 to rotate the contact tip 1200, a spring-loaded protrusion 1230 will slide into the divots on the rear face to indicate that a new groove is contacting the feedstock wire. Thus, after a predetermined time or amount of wire, the contact tips can be selectively adjusted to provide a new contact surface.

The contact tip 1200 provides a plurality of contact points thereby enable continuous operation without any need for any servicing. In some embodiments, the disc-shaped contact tip 1200 may include a plurality of grooves across the front face of the contact tip. The front face may include from 2 to 50 grooves, e.g., 2 to 45 grooves, 2 to 40 grooves, 2 to 30 grooves, 2 to 25 grooves, or any ranges between these ranges.

Figure 13:
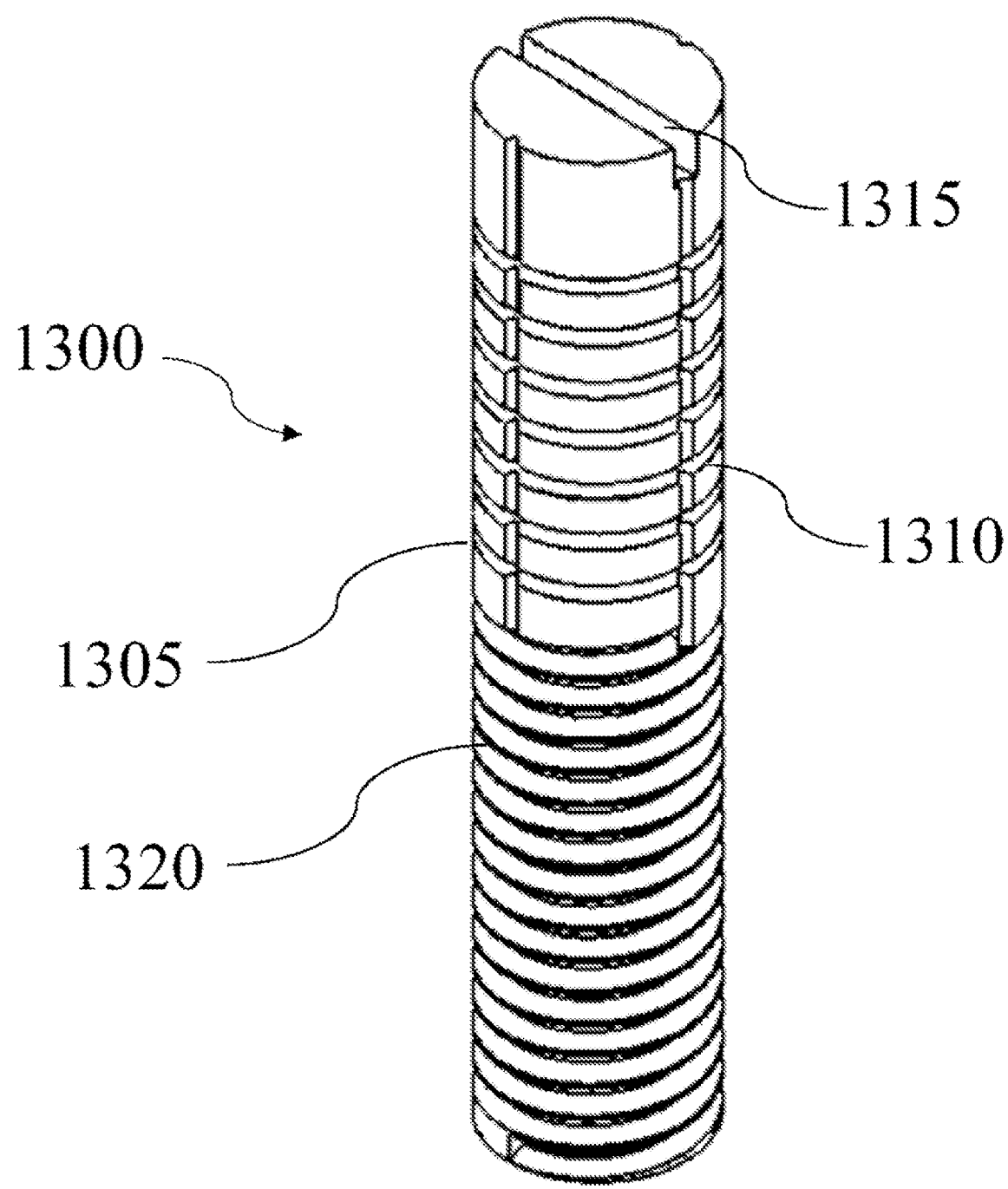
FIG. 13 shows a rod-shaped contact tip including indexable divots for receiving a protrusion according to some embodiments of the present invention.

FIG. 13 shows another embodiment of the rod-shaped contact tip including indexable divots. The rod-shaped contact tip 1300 includes a plurality of grooves 1305. The rod-shaped contact tip 1300 may include a latitudinal intrusion 1310 extending from the top end of the contact tip 1300 to the screw thread 1320. The intersection between the grooves 1305 and the latitudinal intrusion 1310 forms a divot. When a tool is inserted in the tool-receiving element 1315, the rod-shaped contact tip 1300 can be rotated such that a spring-loaded protrusion will slide into the divots.

Figure 14:
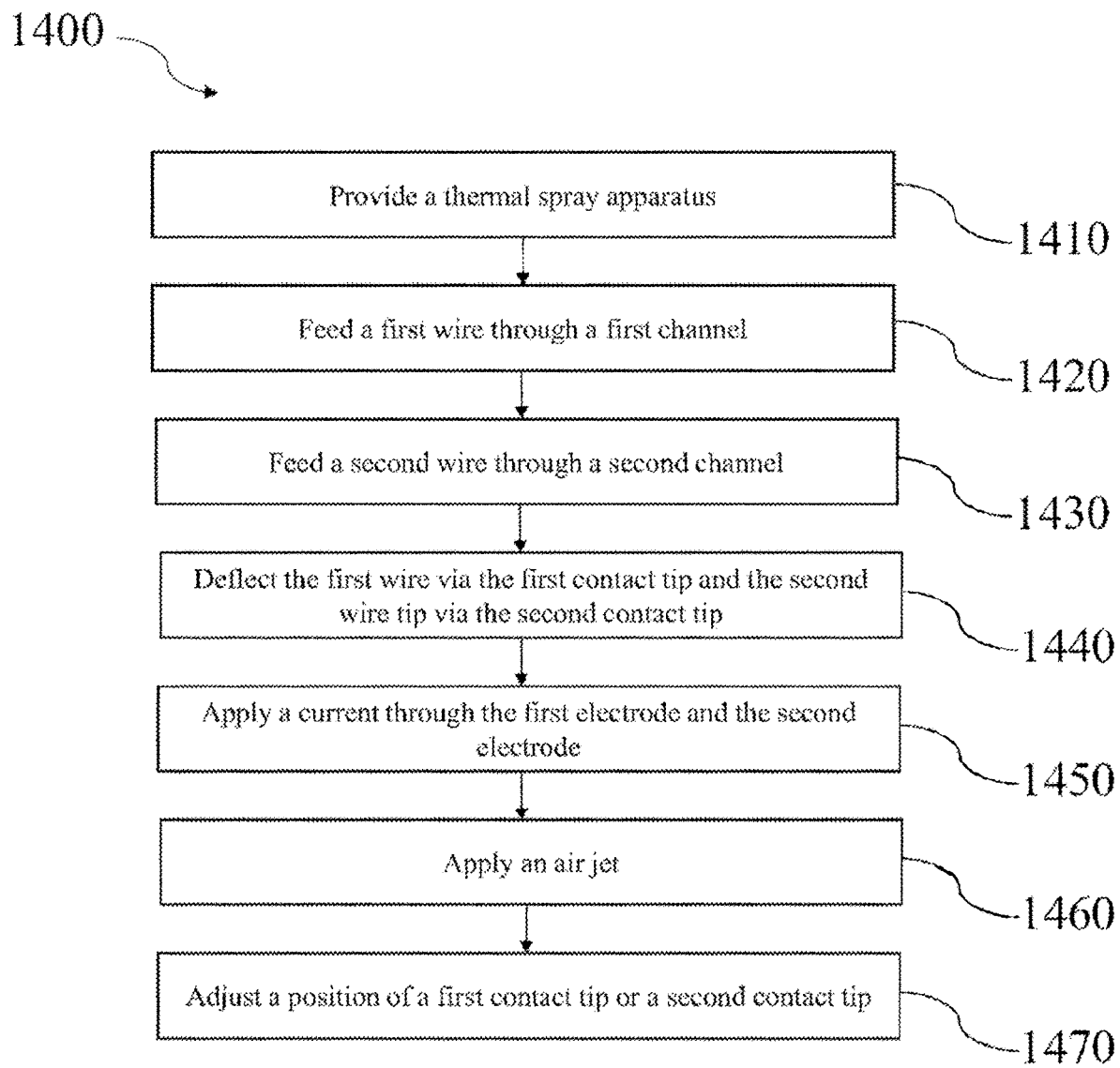
FIG. 14 provides a flowchart of a method according to some embodiments of the present invention.

FIG. 14 provides a flowchart of a method according to some embodiments of the present invention. The method 1400 for applying a metal cladding may include providing a thermal spray apparatus 1410. The thermal spray apparatus may include a housing, a first electrode and second electrode within the housing, and a first electrode and a second electrode. The thermal spray apparatus also includes a first contact tip removably attached to the first electrode and a second contact tip removably attached second electrode. The first contact tip and the second contact tip can be any of the aforementioned contact tips described herein. The thermal spray apparatus may include a nozzle upstream from the first channel and the second channel.

The method 1400 includes feeding a first feedstock wire through the first channel for contacting the first contact tip attached to the first electrode 1420. In some embodiments, the first contact tip can contact and deflect (e.g., guide) the first feedstock wire to the nozzle. The contact established by the first contact tip and the first feedstock wire can supply a charge (e.g., negative or positive) to the first feedstock wire.

The method 1400 includes feeding a second feedstock wire through the second channel for contacting the second contact tip attached to the second electrode 1430. In some embodiments, the second contact tip can contact and deflect (e.g., guide) the second feedstock wire to the nozzle. The contact established by the second contact tip and the second feedstock wire can supply a charge (e.g., negative or positive) to the second feedstock wire.

The method 1400 includes deflecting the first wire via the first contact tip and the second wire via the second contact tip to the nozzle 1440. For example, the first contact tip and the second contact tip can guide or deflect the wires to an intersection point at the nozzle. The intersection point of the oppositely charged wires can melt the wires. In some embodiments, at least one of the first contact tip and the second contact tip may comprise a disc comprising a first end and a second end. The first end comprises a front face and an opposing rear face. The front face may include a plurality of grooves. In some embodiments, at least one of the first contact tip and the second contact tip may comprise a cylindrical rod comprising an outer surface including a plurality of grooves disposed on the outer surface of the rod. The plurality of grooves may be configured for contacting and guiding a wire.

The method 1400 includes applying a current through the first electrode and the second electrode to atomize the first wire and the second wire at a contact point in the nozzle 1450. In some embodiments, a current is applied to each of the first electrode and the second electrode before feeding the first and second feedstock wire. Each of the first electrode and the second electrode supply an opposite charge to the first and second feedstock wire to short circuit the wires at an intersection point.

The method 1400 includes applying an air jet to spray atomized particles through the nozzle 1460. For example, a high-velocity gas can be supplied to the nozzle area to atomize the molten feedstock wires at the intersection point.

The method 1400 includes adjusting a position of at least one of the first contact tip or the second contact tip depending on an amount of wear on a surface of the first contact tip or the second contact tip 1470. For example, the first contact tip or the second contact tip may include a tool-receiving element for adjusting the contact surface (e.g., grooves) of the first contact tip or the second contact tip with each of the feedstock wires. This enables continuous operation of the thermal spray apparatus without replacing the contact tips. In some embodiments, the method includes automatically adjusting a position of the first contact tip and the second contact tip in a continuous or sequential manner. The thermal spray apparatus may include a driver coupled to each of the first contact tip and the second contact tip to automatically adjust the position of the contact surface (e.g., grooves) contacting the wires.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A spray apparatus comprising:
   a housing;
   a first electrode and a second electrode disposed in the housing, wherein the second electrode is spaced apart from the first electrode;
   a first contact tip removably attached to the first electrode and a second contact tip removably attached to the second electrode, wherein at least one of the first contact tip or the second contact tip comprises a disc comprising a first end and a second end, wherein the first end comprises a front face and the second end comprises an opposing rear face, wherein the disc comprises a plurality of grooves disposed radially around the disc extending from the rear face to the front face to provide rotationally indexable wear surfaces; and a nozzle between the first contact tip and the second contact tip, wherein the first contact tip and the second contact tip are configured to deflect and guide the wire towards the nozzle prior to atomization;

a first wire that is configured to be inserted through the housing to be deflected and guided by one of the plurality of grooves of the first contact tip to the nozzle, wherein the one of the plurality of grooves is in plane with the first wire; and a second wire that is configured to be inserted through the housing to be deflected and guided by one of the plurality of grooves the second contact tip to the nozzle, wherein the one of the plurality of grooves is in plane with the first wire, wherein the first wire and second wire intersect at the nozzle for atomization of the first wire and second wire;

wherein the first contact tip and the second contact tip comprise an adjustment mechanism disposed on an exterior of the housing;

wherein the position of the first contact tip or the second tip is configured to be adjusted via the adjustment mechanism to provide one groove of the plurality of grooves in plane with first wire or the second wire without disassembly of the housing.

2. The spray apparatus of claim 1, wherein the rear face of the first contact tip and second contact tip comprises a plurality of notches aligned with at least one of the plurality of grooves;

wherein the housing further comprises a spring-loaded protrusion disposed adjacent the rear face of the first contact tip and second contact tip;

wherein the second end of the first contact and second comprises an intrusion for receiving a tool, wherein the tool is configured to rotate the first contact tip and the second contact tip to secure the spring-loaded protrusion in a notch of the plurality of notches on the rear face.

3. The spray apparatus of claim 1, further comprising an actuator coupled to the first contact tip and the second contact tip to continuously or sequentially rotate the first contact tip, the second contact tip, or both.

4. The spray apparatus of claim 3, wherein the first contact tip and second contact tip comprise a pair of rods for guiding the wire between the rods of the first contact tip and second tip.

5. The spray apparatus of claim 1, further comprising a high-velocity gas system.

6. The spray apparatus of claim 1, further comprising:
a first wire contacting the first contact tip and a second wire contacting the second contact tip; and
a drive system configured to:
feed the first wire through a first channel to the nozzle via the first contact tip; and
feed the second wire through a second channel to the nozzle via the second contact tip.

7. The spray apparatus of claim 1, wherein the plurality of the grooves are located on a surface between the front face and the rear face.

8. The spray apparatus of claim 1, wherein the front face of the first contact tip or the second contact tip has a smaller circumference than the rear face.

9. A system for spraying atomized particles, the system comprising:
a Spray apparatus comprising:
a housing;
a first electrode and a second electrode disposed in the housing, wherein the second electrode is spaced apart from the first electrode;
a first contact tip removably attached to the first electrode and a second contact tip removably attached second electrode, wherein at least one of the first contact tip or the second contact tip comprises a disc comprising a first end and a second end, wherein the first end comprises a front face and the second end comprises an opposing rear face, wherein the disc comprises a plurality of grooves disposed radially around the disc extending from the rear face to the front face to provide rotationally indexable wear surfaces, wherein the rear face comprises a plurality of notches configured to receive a protrusion;
a first channel disposed in the housing; and
a second channel disposed in the housing;
a first wire configured to be inserted through the first channel for contacting at least one groove of the first contact tip on the first electrode; and
a second wire configured to be inserted through the second channel for contacting the at least one groove of the second contact tip on the second electrode;
wherein the first wear surface of the first contact tip and the second contact tip are configured to contact and deflect the first wire and the second wire towards a nozzle;
wherein the first contact tip or the second tip is configured to be adjusted to receive the protrusion in one of the notches of the plurality of notches to the move another groove of the plurality of grooves in plane with the first wire or the second wire without disassembling the housing of the spray apparatus.

10. The system of claim 9, wherein the spray apparatus further comprises:
a nozzle disposed between the first contact tip and the second contact tip, wherein the first contact tip and the second contact tip are configured to deflect a wire towards the nozzle; and
a drive system for feeding the first wire through the first channel and the second wire through the second channel.

11. The system of claim 10, wherein the spray apparatus further comprises a gas supply flow line configured to receive a high-velocity atomizing air jet; and wherein the first contact tip and the second contact tip do not block the gas supply flow line.

12. The system of claim 11, wherein the first electrode is an anode and the second electrode is a cathode, wherein the first wire and the second wire are configured to short circuit at the nozzle.

* * * * *